United States Patent
Li et al.

(10) Patent No.: US 12,389,432 B1
(45) Date of Patent: Aug. 12, 2025

(54) METHOD AND APPARATUS FOR DETERMINATION OF MAXIMUM ALLOWED TRANSMISSION NUMBER FOR SIDELINK REFERENCE SIGNAL AND SIDELINK DATA IN A WIRELESS COMMUNICATION SYSTEM

(71) Applicant: ASUS Technology Licensing Inc., Taipei (TW)

(72) Inventors: Ming-Che Li, Taipei (TW); Li-Chih Tseng, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/094,111

(22) Filed: Mar. 28, 2025

Related U.S. Application Data

(60) Provisional application No. 63/572,131, filed on Mar. 29, 2024.

(51) Int. Cl.
| | |
|---|---|
| H04W 72/04 | (2023.01) |
| H04L 1/1812 | (2023.01) |
| H04L 5/00 | (2006.01) |
| H04W 72/02 | (2009.01) |
| H04W 72/40 | (2023.01) |
| H04W 76/00 | (2018.01) |
| H04W 88/08 | (2009.01) |

(52) U.S. Cl.
CPC .......... *H04W 72/40* (2023.01); *H04L 1/1812* (2013.01); *H04L 5/0048* (2013.01); *H04W 72/02* (2013.01)

(58) Field of Classification Search
None
See application file for complete search history.

(56) References Cited

U.S. PATENT DOCUMENTS

2023/0344563 A1* 10/2023 Huang .............. H04W 74/0808

FOREIGN PATENT DOCUMENTS

| | | | |
|---|---|---|---|
| CN | 119276442 A | * | 1/2025 |
| WO | 2024019880 A1 | | 1/2024 |

* cited by examiner

*Primary Examiner* — Maharishi V Khirodhar
(74) *Attorney, Agent, or Firm* — Skaar Ulbrich Macari, P.A.

(57) ABSTRACT

Methods, systems, and apparatuses are provided for transmission of sidelink reference signals and sidelink data in a wireless communication system, wherein a method of a first device comprises receiving a first configuration of a first sidelink resource pool shared for sidelink data transmission and sidelink reference signal, receiving a second configuration of a first parameter of a maximum number of sidelink data transmissions in the first sidelink resource pool, selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resources.

15 Claims, 9 Drawing Sheets

METHOD AND APPARATUS FOR DETERMINATION OF MAXIMUM ALLOWED TRANSMISSION NUMBER FOR SIDELINK REFERENCE SIGNAL AND SIDELINK DATA IN A WIRELESS COMMUNICATION SYSTEM

CROSS-REFERENCE TO RELATED APPLICATIONS

The present Application claims priority to and the benefit of U.S. Provisional Patent Application Ser. No. 63/572,131, filed Mar. 29, 2024, which is fully incorporated herein by reference.

FIELD

This disclosure generally relates to wireless communication networks and, more particularly, to a method and apparatus for determination of maximum allowed transmission numbers for sidelink reference signals and sidelink data in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmission of sidelink reference signals and sidelink data in a wireless communication system.

In various embodiments, a method of a first device comprises receiving a first configuration of a first sidelink resource pool shared for sidelink data transmission and sidelink reference signal, receiving a second configuration of a first parameter of a maximum number of sidelink data transmissions in the first sidelink resource pool, selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resourcesure.

In various embodiments, a method of a first device comprises receiving a first configuration of a first sidelink resource pool shared for sidelink data transmission and sidelink reference signal, receiving a second configuration of a first parameter of a maximum number of sidelink data transmissions in the first sidelink resource pool, receiving a third configuration of a second sidelink resource pool dedicated for sidelink reference signal, receiving a fourth configuration of a second parameter of a maximum number of sidelink reference signal transmissions in the second sidelink resource pool, wherein when the first device determines to perform transmission of sidelink reference signal in the first sidelink resource pool: selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resources, and wherein when the first device determines to perform transmission of sidelink reference signal in the second sidelink resource pool: selecting a second number for sidelink reference signal transmission based on the second parameter, selecting one or more second sidelink resources, in the second sidelink resource pool, according to at least the second number, and performing at least a second sidelink reference signal transmission on a second sidelink resource of the one or more second sidelink resources.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1]3GPP TS 38.213 V18.2.0 (2024-03) 3GPP; TSG RAN; NR; Physical layer procedures for control (Release 18); [2]3GPP TS 38.214 V18.2.0 (2024-03) 3GPP; TSG RAN; NR; Physical layer procedures for data (Release 18); [3]3GPP TS 38.212 V18.2.0 (2024-03) 3GPP; TSG RAN; NR; Multiplexing and channel coding (Release 18); [4]3GPP TS 38.331 V18.0.0 (2023-12) 3GPP; TSG RAN; NR; Radio Resource Control (RRC) protocol specification (Release 18); [5]3GPP TS 38.321 V18.0.0 (2023-12) 3GPP; TSG RAN; NR; Medium Access Control (MAC) protocol specification (Release 18); [6] RAN1 Chair's Notes of 3GPP TSG RAN WG1 #113; [7] RAN1 Chair's Notes of 3GPP TSG RAN WG1 #116; and [8]R1-2401552, "Reply LS on MAC agreements for SL Positioning", RAN1. The standards and documents listed above are hereby expressly and fully incorporated herein by reference in their entirety.

Figure 1:
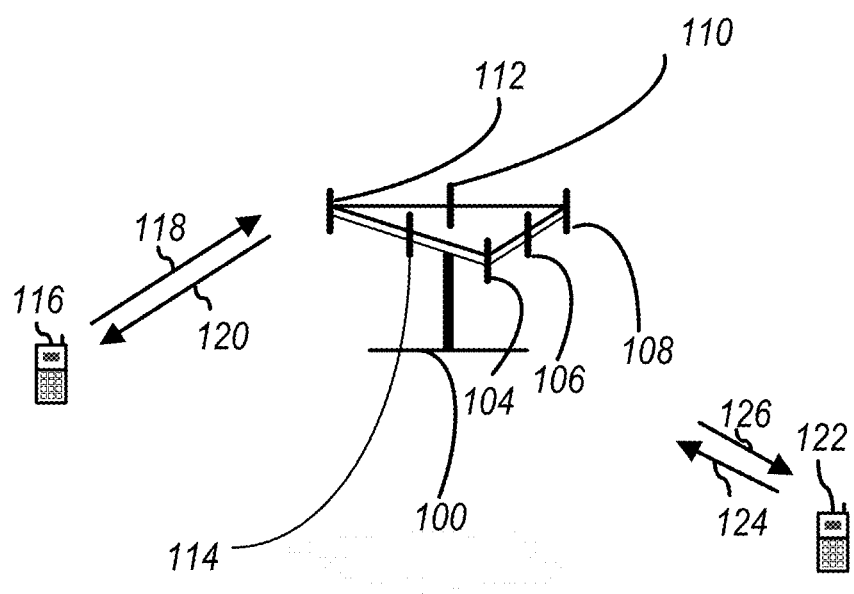
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
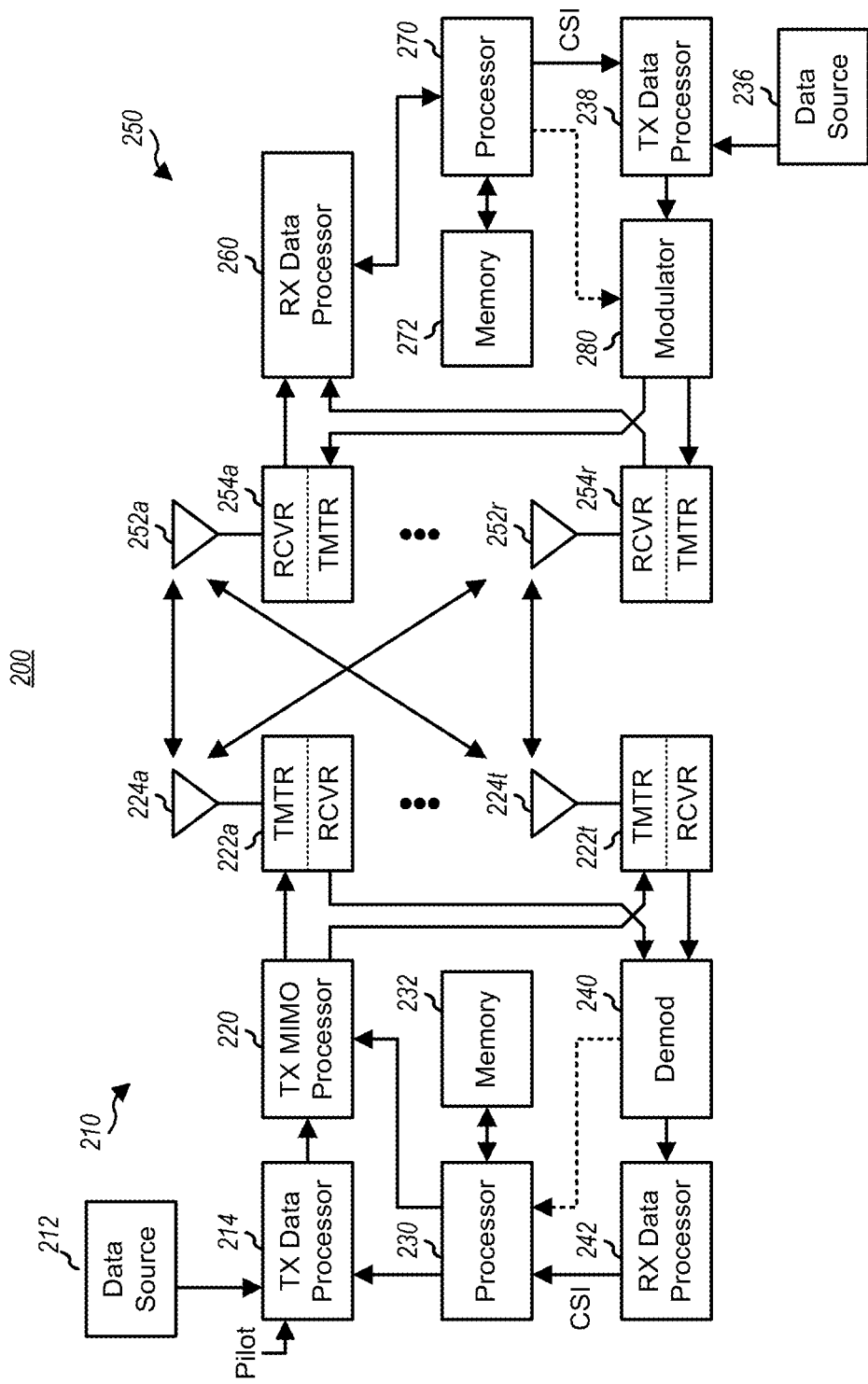
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
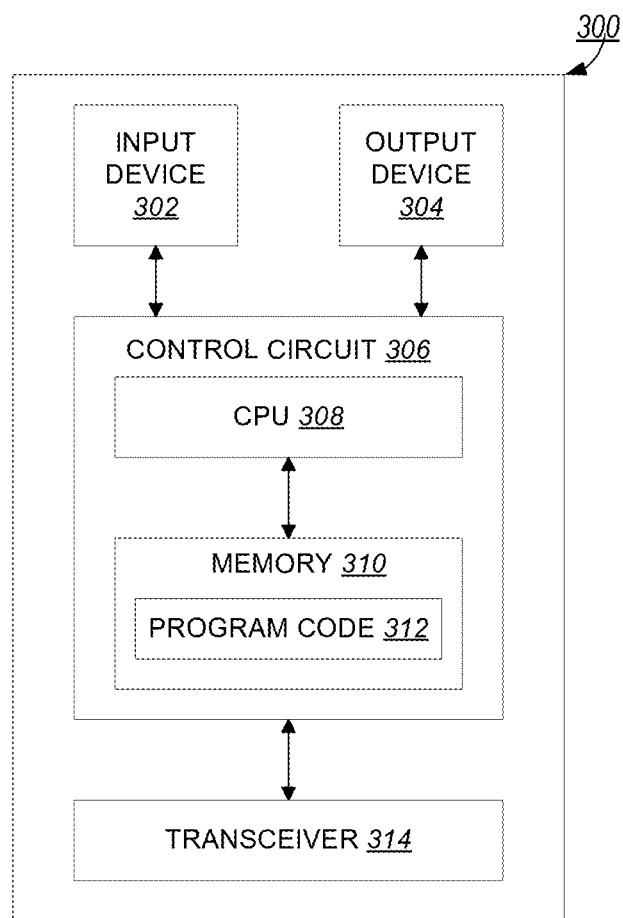
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
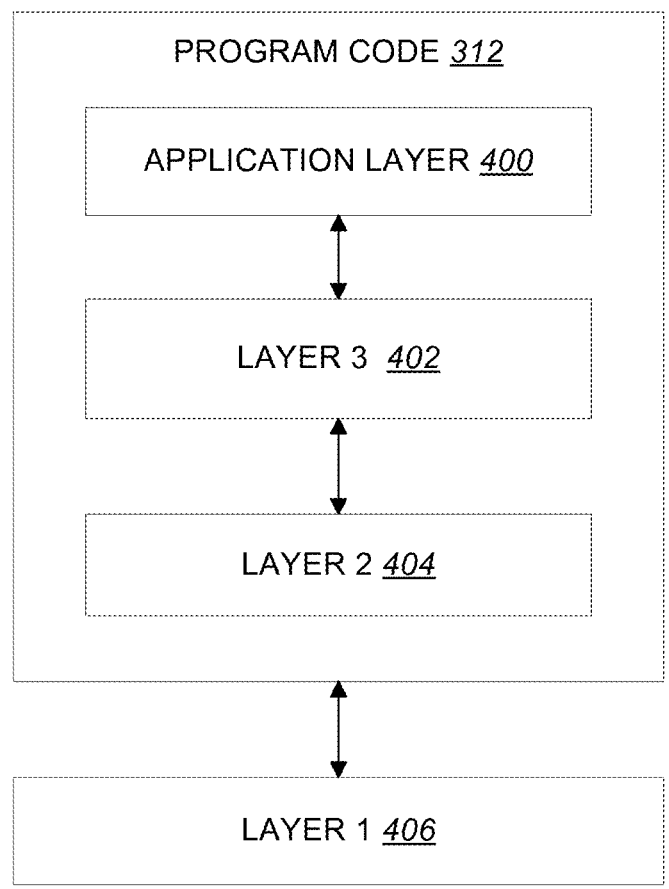
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1]3GPP TS 38.213 V18.2.0 (2024-03), SL related procedures for control are specified.
\*\*\*\*\*\*\*\*\*\*\*\*\*\*\*\*\*\*\*\*\*\*\*\*\*\*\*\*\*\*\*\*QUOTATION [1] START\*\*\*\*\*\*\*\*\*\*\*\*\*\*\*\*\*\*\*\*\*\*\*\*\*\*\*\*\*\*\*\*\*\*

16 UE Procedures for Sidelink

A UE is provided by SL-BWP-Config or SL-BWP-ConfigCommon a BWP for SL transmissions (SL BWP) with numerology and resource grid determined as described in [4, TS 38.211].

. . .

Available slots for a resource pool are provided by sl-TimeResource and occur with a periodicity of 10240 ms. For operation without shared spectrum channel access and for an available slot without S-SS/PSBCH blocks, SL transmissions can start from a first symbol indicated by sl-StartSymbol and be within a number of consecutive symbols indicated by sl-LengthSymbols. For operation with shared spectrum channel access and for an available slot without S-SS/PSBCH blocks, SL transmissions can start from a first symbol indicated by sl-StartingSymbolFirst and be within a number of consecutive symbols indicated by sl-LengthSymbols, or from a second symbol indicated by sl-StartingSymbolSecond [6, TS 38.214], where the ending symbol of SL transmissions starting from the first symbol is same as the ending symbol of SL transmissions starting from the second symbol. For an available slot with S-SS/PSBCH blocks, the first symbol and the number of consecutive symbols are predetermined.

. . .

16.4 UE Procedure for Transmitting PSCCH

A UE can be provided a number of symbols in a resource pool, by sl-TimeResourcePSCCH, starting from
  startingSymbolFirst+1 or startingSymbolSecond+1 in a slot without PSFCH symbols, or startingSymbolFirst+1 in a slot with PSFCH symbols, if startingSymbolFirst and startingSymbolSecond are provided for the SL-BWP
  sl-StartSymbol+1, otherwise
and a number of PRBs in the resource pool, by sl-FreqResourcePSCCH, starting from the lowest PRB index of the lowest sub-channel index, in an RB-set with a lowest index if applicable, of the associated PSSCH for a PSCCH transmission with a SCI format 1-A. For operation with shared spectrum channel access,
  if sl-TransmissionStructureForPSCCHandPSSCH='interlaceRB', the PRBs for PSCCH are within the sub-channel with the lowest index and within the RB-set with the lowest index among the RB-set(s) for the associated PSSCH transmission,
  if sl-TransmissionStructureForPSCCHandPSSCH='contiguousRB', the PRBs for PSCCH are within the sub-channel with the lowest index in the RB-set with the lowest index among the RB-set(s) for the associated PSSCH transmission, and all PRBs in the sub-channel overlapping with intra-cell guard band [6, TS 38.214] are not used for PSCCH.

A UE that transmits a PSCCH with SCI format 1-A using sidelink resource allocation mode 2 [6, TS 38.214] sets
  "Resource reservation period" as an index in sl-ResourceReservePeriodList corresponding to a reservation period provided by higher layers [11, TS 38.321], if the UE is provided sl-MultiReserveResource
  the values of the frequency resource assignment field and the time resource assignment field as described in [6, TS 38.214] to indicate N resources from a set {Ry} of resources selected by higher layers as described in [11, TS 38.321] with N smallest slot indices $y_i$ for $0 \leq i \leq N-1$ such that $y_0 < \ldots < y_{N-1} \leq y_0+31$, where:

. . .

16.4A UE Procedure for Transmitting PSCCH in Dedicated SL PRS resource pool

For a dedicated SL PRS resource pool, a UE can be provided a number of symbols in the resource pool, by timeResourcePSCCH-DedicatedSL-PRS-RP, starting from a second symbol that is available for SL transmissions in a slot, and a number of PRBs in the resource pool, by freqResourcePSCCH-DedicatedSL-PRS-RP, starting from a PRB with lowest index for a sub-channel determined according to an index of an associated SL PRS resource, for a PSCCH transmission with a SCI format 1-B.

A UE that transmits a PSCCH with SCI format 1-B using SL PRS resource allocation mode 2 [6, TS 38.214] sets
  "Source ID" as indicated by higher layers
  "Destination ID" as indicated by high layers
  "Cast type indicator" as indicated by higher layers
  "Resource reservation period" as an index in sl-PRS-ResourceReservePeriodList corresponding to a reservation period provided by higher layers [11, TS 38.321], if the UE is provided sl-MultiReserveResource
  the values of the time resource assignment field and of the resource ID indication field as described in [6, TS 38.214] to indicate N resources from a set {Ry} of resources selected by higher layers as described in [11, TS 38.321] with N smallest slot indices $y_i$ for $0 \leq i \leq N-1$ such that $y_0 < y_1 < y_{N-1} \leq y_0+31$, where:

. . .

A UE that transmits a PSCCH with SCI format 1-B using SL PRS resource allocation mode 1 [6, TS 38.214] sets
  "Source ID" as indicated by higher layers
  "Destination ID" as indicated by high layers
  "Cast type indicator" as indicated by higher layers
  the values of the resource ID indication field and the time resource assignment field for the SCI format 1-B transmitted in the m-th resource for SL PRS and the corresponding PSCCH transmission provided by a dynamic grant or by a SL configured grant, where m={1, . . . , M} and M is the total number of resources for SL PRS and the corresponding PSCCH transmission provided by a dynamic grant or the number of resources for SL PRS transmission in a period provided by a SL configured grant type 1 or SL configured grant type 2, as follows:
    the resource ID indication field and time resource assignment field indicate the m-th to M-th resources as described in [6, TS 38.214].
  "SL PRS request" as indicated by higher layers For decoding of a SCI format 1-B, a UE may assume that a number of bits provided by sl-NumReservedBitsSC11B-DedicatedSL-PRS-RP can have any value as described in [4, TS 38.212].
\*\*\*\*\*\*\*\*\*\*\*\*\*\*\*\*\*\*\*\*\*\*\*\*\*\*\*\*\*\*\*\*QUOTATION [1] END\*\*\*\*\*\*\*\*\*\*\*\*\*\*\*\*\*\*\*\*\*\*\*\*\*\*\*\*\*\*\*\*\*\*

In [2]3GPP TS 38.214 V18.2.0 (2024-03), SL related procedures for data are specified.
\*\*\*\*\*\*\*\*\*\*\*\*\*\*\*\*\*\*\*\*\*\*\*\*\*\*\*\*\*\*\*\*QUOTATION [2] START\*\*\*\*\*\*\*\*\*\*\*\*\*\*\*\*\*\*\*\*\*\*\*\*\*\*\*\*\*\*\*\*\*\*

8 Physical Sidelink Shared Channel Related Procedures

A UE can be configured by higher layers with one or more sidelink resource pools. A sidelink resource pool can be for transmission of PSSCH, as described in Clause 8.1, and/or SL PRS, as described in Clause 8.2.4, or for reception of PSSCH, as described in Clause 8.3, and/or SL PRS, as described in Clause 8.4.4, and can be associated with either sidelink resource allocation mode 1 or sidelink resource allocation mode 2.

A sidelink resource pool which can be used for transmission of both SL PRS and PSSCH will be referred to as shared SL PRS resource pool.

A sidelink resource pool which can be used for transmission of SL PRS and cannot be used for transmission of PSSCH will be referred to as dedicated SL PRS resource pool.

. . .

The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$, the slot index is relative to slot #0 of the radio frame corresponding to SFN 0 of the serving cell or DFN 0, the set includes all the slots except the following slots, $N_{S-SSB}$ slots in which S-SS/PSBCH block (S-SSB) or additional transmission occasion for S-SSB is configured, $N_{nonsL}$ slots in each of which at least one of Y-th, (Y+1)-th, . . . , (Y+X−1)-th OFDM symbols are not semi-statically configured as UL as per the higher layer parameter tdd-UL-DL-ConfigurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.

The reserved slots which are determined by the following steps.

. . . The UE determines the set of logical slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $t_k^{SL}$ $(0 \leq k < 10240 \times 2^\mu - N_{S-SSB} - N_{nonSL} - N_{reserved})$ belongs to the set if $b_{k'}=1$ where $k'=k \bmod L_{bitmap}$.

The slots in the set are re-indexed such that the subscripts i of the remaining slots $t'_i^{SL}$ are successive $\{0, 1, \ldots, T'_{max}-1\}$ where $T'_{max}$ is the number of the slots remaining in the set.

The UE determines the set of resource blocks assigned to a sidelink resource pool as follows:

The resource block pool consists of $N_{PRB}$ PRBs.

If the higher layer parameter transmissionStructureForPSCCHandPSSCH is not provided, or is set to 'contiguousRB', the sub-channel m for m=0,1, . . . , numSubchannel−1 consists of a set of $n_{subCHsize}$ contiguous resource blocks with the physical resource block number $n_{PRB}=n_{subCHRBstart}+m \cdot n_{subCHsize}+j$ for $j=0,1, \ldots, n_{subCHsize}-1$, where $n_{subCHRBstart}$, $n_{subCHsize}$ and numSubchannel are given by higher layer parameters sl-StartRB-Subchannel, sl-SubchannelSize and sl-NumSubchannel, respectively.

. . .

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

. . .

. . . 8.1.2 Resource Allocation

. . .

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters sl-StartSymbol and sl-LengthSymbols, where sl-StartSymbol is the symbol index of the first symbol of sl-LengthSymbols consecutive symbols configured for sidelink.

Within the slot, PSSCH resource allocation starts at symbol sl-StartSymbol+1, except when startingSymbolFirst and startingSymbolSecond are provided for a SL-BWP. If startingSymbolFirst and startingSymbolSecond are provided for the SL-BWP, there are 2 candidate starting symbols, given by startingSymbolFirst and startingSymbolSecond respectively, for PSSCH transmission for slots without PSFCH symbols; and there is one starting symbol, given by startingSymbolFirst, for PSSCH transmission for slots with PSFCH symbols. PSSCH resource allocation starts at the next symbol after each candidate starting symbol. In a slot, the UE may use the second candidate starting symbol, provided by startingSymbolSecond, only if it fails to access the channel prior to the first candidate starting symbol provided by startingSymbolFirst.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

. . .

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

. . .

8.1.4 UE Procedure for Determining the Subset of Resources to be Reported to higher layers in PSSCH resource selection in sidelink resource allocation mode 2

In resource allocation mode 2, the higher layer can request the UE to determine a subset of resources from which the higher layer will select resources for PSSCH/PSCCH transmission for a carrier. To trigger this procedure, in slot n for this carrier, the higher layer provides the following parameters for this PSSCH/PSCCH transmission:
  the resource pool from which the resources are to be reported;
  L1 priority, $prio_{TX}$;
  the remaining packet delay budget;
. . .

8.1.5 UE Procedure for Determining Slots and Resource Blocks for PSSCH transmission associated with an SCI format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below. 'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:
. . .
where the first resource is in the slot where SCI format 1-A was received, and $t_i$ denotes i-th resource time offset in logical slots of a resource pool with respect to the first resource where for N=2, $1 \le t_1 \le 31$; and for N=3, $1 \le t_1 \le 30$, $t_1 < t_2 \le 31$.

The starting sub-channel $n_{subCH,0}^{start}$ of the first resource is determined according to clause 8.1.2.2. The number of contiguously allocated sub-channels for each of the N resources $L_{subCH} \ge 1$ and the starting sub-channel indexes of resources indicated by the received SCI format 1-A, except the resource in the slot where SCI format 1-A was received, are determined from "Frequency resource assignment" which is equal to a frequency RIV (FRIV) where.
. . .
. . .

8.2 UE Procedure for Transmitting Sidelink Reference Signals 8.2.1 CSI-RS Transmission Procedure A UE transmits sidelink CSI-RS within a unicast PSSCH transmission if the following conditions hold:
  CSI reporting is enabled by higher layer parameter sl-CSI-Acquisition; and
  the 'CSI request' field in the corresponding SCI format 2-A, 2-C or 2-D is set to 1.

The following parameters for CSI-RS transmission are configured for each CSI-RS configuration:
  sl-CSI-RS-FirstSymbol indicates the first OFDM symbol in a PRB used for SL CSI-RS
  sl-CSI-RS-FreqAllocation indicates the number of antenna ports and the frequency domain allocation for SL CSI-RS.
. . .

8.2.4 SL PRS Transmission Procedure

The following parameters for SL PRS transmission are associated with each SL PRS resource:
  SL PRS resource ID provided by sl-PRS-ResourceID indicates an identity of a SL PRS resource. The SL PRS resource is identified by the SL PRS resource ID that is unique within a slot of a dedicated SL PRS resource pool. For a shared SL PRS resource pool, a SL PRS resource is uniquely identified by a combination of the SL PRS resource ID, SL PRS frequency domain allocation within a slot indicated by "frequency resource assignment" field in the associated SCI format 1-A, and a starting symbol within the slot as determined by clause 8.2.4.1.1.
  sl-CombSize and sl-PRS-comb-offset indicates a comb offset and a comb size of the SL PRS resource
  sl-PRS-starting-symbol and sl-NumberOfSymbols indicates the starting symbol index and the number of symbols of the SL PRS resource within a slot in a dedicated SL PRS resource pool. sl-NumberOfSymbols indicates the number of symbols of the SL PRS resource within a slot in a shared SL PRS resource pool.

For a dedicated SL PRS resource pool, SL PRS resources for a same $\{L_{SL-PRS}, K_{comb}^{SL-PRS}\}$ combination of number of SL PRS symbols $L_{SL-PRS}$ and comb size $K_{comb}^{SL-PRS}$ can be mapped to a set of consecutive symbols in a slot. SL PRS resources for different $\{L_{SL-PRS}, K_{comb}^{SL-PRS}\}$ combinations shall be mapped to non-overlapping sets of consecutive symbols in a slot. Up to four non-overlapping sets of consecutive symbols within a slot can be used to map SL PRS resources for same or different $\{L_{SL-PRS}, K_{comb}^{SL-PRS}\}$ combinations, where the case of four non-overlapping sets of consecutive symbols only applies when $K_{comb}^{SL-PRS}=2$ for all the $\{L_{SL-PRS}, K_{comb}^{SL-PRS}\}$ combinations.

Each SL PRS transmission is associated with an PSCCH transmission in the same slot.

In the case of dedicated SL PRS resource pool, that PSCCH carries the SCI format 1-B associated with the SL PRS transmission.

The UE may report the association information between the already transmitted SL PRSs of SL PRS resources and UE Tx ARP ID. The association information includes ARP ID(s) indicated by sl-POS-ARP-ID-Tx, SL PRS transmission timestamp(s) indicated by sl-TimeStamp, and optional SL PRS resource ID(s) indicated by sl-PRS-ResourceID.

8.2.4.1 Resource Allocation

In sidelink resource allocation mode 1:
  for SL PRS transmission, dynamic grant, configured grant type 1, and configured grant type 2 are supported.
  for a dedicated SL PRS resource pool, the UE shall perform the procedure described in clause 8.6 (excluding the case of PSSCH for retransmission of a transport block), with the following modifications:
    "PSSCH for a transport block" is replaced by "SL PRS"
    "PSSCH" is replaced by "SL PRS".

The total number of SL configured grants including type 1 and type 2 across all resource pools is not greater than 8.

8.2.4.1.1 Resource Allocation in Time Domain

The UE shall transmit the SL PRS in the same slot as the associated PSCCH.

For a dedicated SL PRS resource pool, the minimum resource allocation unit in the time domain is a SL PRS resource in a slot.

The UE shall transmit the SL PRS in consecutive symbols within the slot.

A UE does not transmit multiple SL PRS resources in the same slot.

For a shared SL PRS resource pool, the UE transmits the SL PRS in PSSCH symbols according to clause 8.1.2.1, with the following restrictions:
  the number of contiguous symbols for SL PRS transmission, $L_{SL-PRS}$, shall correspond to one of the SL PRS resources in parameter SL-PRS-ResourceSharedSL-PRS-RP.
  the UE shall not transmit SL PRS in symbols where associated PSCCH is transmitted.
  the UE shall not transmit SL PRS and PSSCH DMRS in the same symbol.
  the UE shall not transmit SL PRS and SL CSI-RS in the same symbol.

the UE shall transmit SL PRS on contiguous symbols either in between or after symbols where PSSCH DMRS is transmitted.

the UE shall transmit SL PRS only after the last symbol with second stage SCI.

For a given value of $L_{SL\text{-}PRS}$, SL PRS resource is mapped to the last consecutive $L_{SL\text{-}PRS}$ SL symbols in the slot that meet all the other restrictions For a dedicated SL PRS resource pool, the UE transmits SL PRS subject to the following restrictions:

the UE shall not transmit SL PRS and associated PSCCH in the same symbol;

the number of contiguous symbols and the starting symbol for SL PRS transmission shall correspond to one of the SL PRS resources in parameter SL-PRS-ResourceDedicatedSL-PRS-RP.

In sidelink resource allocation mode 1 for a shared SL PRS resource pool, the time domain behaviour for sidelink dynamic grants and sidelink configured grants for SL PRS follows the behaviour in clause 8.1.2.1.

In sidelink resource allocation mode 1 for a dedicated SL PRS resource pool, the time domain behaviour for sidelink dynamic grants and sidelink configured grants for SL PRS follows the behaviour in clause 8.1.2.1, with the following modifications:

"DCI format 3_0" is replaced by "DCI format 3_2".

"PSSCH" is replaced by "SL PRS".

8.2.4.1.2 Resource Allocation in Frequency Domain

For a shared SL PRS resource pool, the frequency domain resource assignment of a SL PRS resource is the same as PSSCH in the same slot.

For a dedicated SL PRS resource pool, the frequency domain resource assignment of a SL PRS resource is same as frequency resources of the resource pool provided by the higher layer parameter sl-RB-Number.

8.2.4.2 UE Procedure for Determining the Subset of Resources to be Reported to Higher layers in SL PRS resource selection in a dedicated SL PRS resource pool in sidelink resource allocation mode 2

In resource allocation mode 2 in a dedicated SL PRS resource pool, the higher layer can request the UE to determine a subset of resources from which the higher layer will select resources for SL PRS/PSCCH transmission. To trigger this procedure, in slot n, the higher layer provides the following parameters for this SL PRS/PSCCH transmission:

the resource pool from which the resources are to be reported;

L1 priority, $prio_{TX}$;

the remaining SL PRS delay budget;

Set of SL-PRS resource ID(s);

optionally, the resource reservation interval, $P_{rsvp\_TX}$, in units of msec.

. . .

The UE shall perform this procedure according to clause 8.1.4, with the following modifications:

"packet delay budget" is replaced by "SL PRS delay budget", partial sensing is not applicable in a dedicated SL PRS resource pool, "candidate single-slot resource" is replaced by "candidate SL PRS resource", a candidate single-slot resource for transmission R is defined as the SL PRS resource with index x within the Set of SL-PRS resource ID(s) provided by the higher layer and in slot $t'^{SL}_y$, "SCI format 1-A" is replaced by "SCI format 1-B", in step 5, the second condition is modified as follows: for any periodicity value allowed by the higher layer parameter sl-PRS-ResourceReservePeriodList and any SL PRS resource ID in the set of SL PRS resource ID(s) provided by the higher layer, and a hypothetical SCI format 1-B received in slot $t'^{SL}_m$ with 'Resource reservation period' field set to that periodicity value and indicating that SL-PRS resource ID, condition c in step 6 would be met, In condition b of step 6, the RSRP measurement is the PSCCH-RSRP over the DM-RS resource elements of the PSCCH;

In condition c of step 6 "determines according to clause 8.1.5 the set of resource blocks and slots" is replaced by "determines according to clause 8.2.4.2A the set of SL PRS resources and slots".

8.2.4.2A UE Procedure for Determining Slots and SL PRS Resource(s) Associated with an SCI Format 1-B in a Dedicated SL PRS Resource Pool The set of slots and SL PRS resources for SL PRS transmission is determined by the PSCCH containing the associated SCI format 1-B, and fields 'SL-PRS resource ID (s)', 'Time resource assignment' of the associated SCI format 1-B as described below.

The set of slots is determined as in clause 8.1.5, with the following modifications:

"SCI format 1-A" is replaced by "SCI format 1-B", [potential parameter name changes].

The first SL PRS resource is determined according to the sub-channel used for the PSCCH transmission containing the associated SCI format 1-B, where the index of the sub-channel in the resource pool is identical to the index of the SL PRS resource provided by sl-PRS-ResourceID.

The second SL-PRS and third SL PRS resource, if reserved by SCI format 1-B, are determined from "Resource ID indication" which is equal to a PRS Resource ID value (PRIV) where, If sl-MaxNumPerReserveDedicatedSL-PRS-RP is 2 then $$PRIV=r_1$$

If sl-MaxNumPerReserveDedicatedSL-PRS-RP is 3 then $$PRIV=r_2 * N_{SL\text{-}PRS}+r_1$$

Where $r_1$ denotes the SL PRS resource ID for the second resource $r_2$ denotes the SL PRS resource ID for the third resource $N_{SL\text{-}PRS}$ is the number of SL-PRS resources (pre-)configured in a slot of a resource pool.

. . .

8.2.4.3 Sidelink Congestion Control in a Dedicated SL PRS Resource Pool in Sidelink Resource Allocation Mode 2

When transmitting SL-PRS in a dedicated SL PRS resource pool the UE shall perform sidelink congestion control as specified in clause 8.1.6, with the following modification(s):

"PSSCH" is replaced by "SL PRS"

[potential parameter name changes]

[potential changes to processing times]

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A, 2-B, 2-C and 2-D, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A, 2-B, 2-C and 2-D, and associated PSSCH resource configuration configured by higher layers. The UE is not required to decode more than one PSCCH at each PSCCH resource candidate.

A UE is required to decode neither the corresponding SCI formats 2-A, 2-B, 2-C nor the PSSCH associated with an SCI format 1-A if the SCI format 1-A indicates an MCS table that the UE does not support.

In any slot without PSFCH symbols, the UE attempts, subject to UE capability, to decode PSSCH transmission starting from the second candidate starting symbol provided by sl-startingSymbolSecond, if sl-startingSymbolFirst and sl-startingSymbolSecond are provided.

8.4 UE Procedure for Receiving Reference Signals

. . .

8.4.4 SL PRS Reception Procedure

The UE may be configured to measure and report one or more of the SL RSTD, SL Rx-Tx time difference, SL RTOA, SL PRS-RSRPP, for the first detected path and up to 8 additional detected paths, and SL PRS-RSRP measurements. The UE may be configured to measure and report one or more of the SL AoA, SL PRS-RSRPP for the first path and up to 2 additional detected paths, and SL PRS-RSRP measurement.

The UE may report an ARP ID associated with the reported measurements. The UE may provide the ARP location information via sl-ARP-LocationInfoPerTxUE.

The UE uses the same ARP for both the transmission and reception of sidelink positioning reference signals while performing an SL Rx-Tx time difference measurement.

The UE may include SL PRS resource ID(s) when it reports one or more of the SL RSTD, SL Rx-Tx time difference, SL RTOA, SL AoA, SL PRS-RSRP, and SL PRS-RSRPP measurements.

For the SL RSTD, SL Rx-Tx time difference, SL RTOA, SL AoA, SL PRS-RSRP, and SL PRS-RSRPP measurements, the UE reports an associated SL PRS reception timestamp via higher layer parameter Timestamps. For SL Rx-Tx time difference, the UE may report an associated SL PRS transmission timestamp via higher layer parameter tx-TimeInfo and the UE may be configured to report a SL PRS transmission timestamp via associatedSL-PRS-Tx-TimeStampRequest. The timestamp includes the SFN, slot number, and optionally nr-PhysCellID, nr-ARFCN, nr-CellGlobalID, or the timestamp includes DFN and slot number. The timestamp of DFN and slot number may include synchronization source indication of DFN.

The UE may be configured to report up to N Rx-Tx time difference measurements for the same SL PRS transmission associated with N different SL PRS receptions for the same pair of UE(s). The UE may be configured to report up to N Rx-Tx time difference measurements for the same SL PRS reception associated with N different SL PRS transmissions for the same pair of UE(s).

The UE may report, LoS/NLoS indicator(s) via losNLOS-Indicator associated with each SL RSTD, SL Rx-Tx time difference, SL RTOA, SL AoA, SL PRS-RSRP, and SL PRS-RSRPP measurements.

The UE may report synchronization source type via syncSourceType and/or relative time difference with the associated quality metric, via sl-RTD-Info. If reported syncSourceType is gNB-eNB, the UE may report cell identity information. For UE-based positioning, the UE may be provided with synchronization source type of a UE and/or the relative time difference with the associated quality metric, via syncSourceType and sl-RTD-Info, respectively. For the SL RSTD measurement, the UE may report a reference UE information.

For SL RTOA measurement, SFN or DFN initialization time may be provided to the UE by a UE or the network.

The UE may be provided with the location information of other UEs via anchorUE-LocationInformation. The UE may report the location information of the UE to the network.

The UE may be provided with expected SL AoA and uncertainty range of the expected SL AoA via expectedSL-AzimuthAoA-AndUncertainty and expectedSL-ZenithAoA-AndUncertainty.

The UE may report quality metric sl-TimingQuality corresponding to the SL RSTD, SL RTOA or SL Rx-Tx time difference measurements. The UE may report quality metric sl-AngleQuality corresponding to the SL AoA measurement.

If the 'SL PRS request' field in the SCI associated with the received SL PRS is set to 1 then this request for SL PRS transmission is reported to higher layers.

8.5 UE Procedure for Reporting Channel State Information (CSI)

8.5.1 Channel State Information Framework

CSI consists of Channel Quality Indicator (CQI) and Rank Indicator (RI). The CQI and RI are always reported together.

8.5.1.1 Reporting Configurations

The UE shall calculate CSI parameters (if reported) assuming the following dependencies between CSI parameters (if reported)

. . .

**********************************QUOTATION [2] END*******************************

In [3]3GPP TS 38.212 V18.2.0 (2024-03), SL related control information is specified.

**********************************QUOTATION [3] START*******************************

8.3 Sidelink Control Information on PSCCH

SCI carried on PSCCH is a $1^{st}$-stage SCI, which transports sidelink scheduling information.

8.3.1 $1^{st}$-Stage SCI Formats

. . .

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

Frequency resource assignment—number of bits determined by the following:

. . .

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period $-\lfloor \log_2 N_{rsv\_period} \rfloor$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

. . .

$2^{nd}$-stage SCI format—2 bits as defined in Table 8.3.1.1-1.

...

TABLE 8

3.1.1-1: $2^{nd}$-stage SCI formats

| Value of 2nd-stage SCI format field | 2nd-stage SCI format |
|---|---|
| 00 | SCI format 2-A |
| 01 | SCI format 2-B; or reserved if higher layer parameter transmissionStructureForPSCCHandPSSCH in SL-BWP-Config is configured SCI format 2-C; or reserved if higher layer parameter transmissionStructureForPSCCHandPSSCH in SL-BWP-Config is configured and the COT sharing flag field is set to '1' |
| 10 | |
| 11 | SCI format 2-D; or reserved if higher layer parameter transmissionStructureForPSCCHandPSSCH in SL-BWP-Config is configured |

8.3.1.2 SCI Format 1-B

SCI format 1-B is used for the scheduling of SL PRS for a dedicated SL PRS resource pool.

The following information is transmitted by means of the SCI format 1-B:

Priority—3 bits as specified in clause 5.7 of [12, TS 23.586] and clause 5.22 of [8, TS 38.321]. Value '000' of Priority field corresponds to priority value '1', value '001' of Priority field corresponds to priority value '2', and so on.

Source ID—12 or 24 bits determined by higher layer parameter sl-SRC-ID-LenDedicatedSL-PRS-RP, as defined in clause 16.4A of [5, TS 38.213].

Destination ID—24 bits as defined in clause 16.4A of [5, TS 38.213].

Cast type indicator—2 bits as defined in Table 8.3.1.2-1 and in clause 16.4A of [5, TS 38.213].

Resource reservation period—$\lceil \log_2 N_{rsv\_period} \rceil$ bits as defined in clause 16.4A of [5, TS 38.213], where $N_{rsv\_period}$ is the number of entries in the higher layer parameter sl-PRS-ResourceReservePeriodList, if higher layer parameter sl-PRS-ResourceReservePeriodList is configured; 0 bit otherwise.

Time resource assignment—5 bits when the value of the higher layer parameter sl-MaxNumPerReserveDedicatedSL-PRS-RP is configured to 2; otherwise 9 bits when the value of the higher layer parameter sl-MaxNumPerReserveDedicatedSL-PRS-RP is configured to 3, as defined in clause 8.2.4.2A of [6, TS 38.214].

Resource ID indication—$\lceil \log_2 N_{SL-PRS} \rceil$ bits when the value of the higher layer parameter sl-MaxNumPerReserveDedicatedSL-PRS-RP is configured to 2; otherwise $\lceil 2 \log_2 N_{SL-PRS} \rceil$ bits when the value of the higher layer parameter sl-MaxNumPerReserveDedicatedSL-PRS-RP is configured to 3. The value $N_{SL-PRS}$ is the total number of SL PRS resources within a slot in a dedicated SL PRS resource pool and provided by the higher layer parameter sl-PRS-ResourcesDedicatedSL-PRS-RP.

SL PRS request—1 bit as defined in clause 8.4.4 of [6, TS 38.214] when the higher layer parameter sl-SCI-basedSL-PRS-TxTriggerSCI1-B is provided; 0 bit otherwise.

Reserved—$N_{reserved}$ bits as configured by higher layer parameter sl-NumReservedBitsSCI1B-DedicatedSL-PRS-RP, with value set to zero.

...

8.4 Sidelink Control Information on PSSCH

SCI carried on PSSCH is a $2^{nd}$-stage SCI, which transports sidelink scheduling information, and/or inter-UE coordination related information.

8.4.1 $2^{nd}$-Stage SCI Formats

...

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

...

8.4.1.2 SCI Format 2-B

SCI format 2-B is used for the decoding of PSSCH, with HARQ operation when HARQ-ACK information includes only NACK, or when there is no feedback of HARQ-ACK information.

...

8.4.1.3 SCI Format 2-C

SCI format 2-C is used for the decoding of PSSCH, and providing inter-UE coordination information or requesting inter-UE coordination information. SCI format 2-C can be used only for unicast.

...

8.4.1.4 SCI Format 2-D

SCI format 2-D is used for the decoding of PSSCH and the scheduling of SL PRS for a shared SL PRS resource pool. The following information is transmitted by means of the SCI format 2-D:

SL PRS resource ID—$\lceil \log_2 N_{SL-PRS} \rceil$ bits, where the value $N_{SL-PRS}$ is the total number of SL PRS resource IDs within a slot in a shared SL PRS resource pool and provided by the higher layer parameter sl-PRS-ResourcesSharedSL-PRS-RP.

SL PRS request—1 bit as defined in clause 8.4.4 of [6, TS 38.214] when the higher layer parameter sl-SCI-based-SL-PRS-Tx-Trigger-SCI2-D is provided; 0 bit otherwise.

Embedded SCI format—2 bits. This field indicates the embedded SCI format as defined in Table 8.4.1.4-1.

Embedded SCI format payload—number of bits determined according to Table 8.4.1.4-1. This field is set to the associated payload of the embedded SCI format indicated by the 'Embedded SCI format' field as defined in Table 8.4.1.4-1.

TABLE 8

4.1.4-1: Embedded SCI format and payload

| Value of the Embedded SCI format field | Embedded SCI format | Embedded SCI format payload |
|---|---|---|
| 00 | SCI format 2-A | Set to all fields included in SCI format 2-A. Padding bits, if necessary, are appended to the 'Embedded SCI format payload' field untill the bitwidth equals the larger payload size of SCI format 2-A and SCI format 2-B. |

TABLE 8-continued 4.1.4-1: Embedded SCI format and payload

| Value of the Embedded SCI format field | Embedded SCI format | Embedded SCI format payload |
|---|---|---|
| 01 | SCI format 2-B | Set to all fields included in SCI format 2-B. Padding bits, if necessary, are appended to the 'Embedded SCI format payload' field untill the bitwidth equals the larger payload size of SCI format 2-A and SCI format 2-B. |
| 10 | Reserved | Reserved |
| 11 | Reserved | Reserved |

8.4.4 Rate Matching

For $2^{nd}$-stage SCI transmission on PSSCH with SL-SCH, the number of coded modulation symbols generated for $2^{nd}$-stage SCI transmission prior to duplication for the 2nd layer if present, denoted as $Q_{SCI2}'$, is determined as follows:

. . .

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.
*******************************QUOTATION [3] END**********************************

In [4]3GPP TS 38.331 V18.0.0 (2023-12), SL-PRS related configurations in the Radio Resource Control (RRC) layer are specified.
*******************************QUOTATION [4] START*********************************

SL-CBR-PriorityTxConfigList

The IE SL-CBR-PriorityTxConfigList indicates the mapping between PSSCH transmission parameter (such as MCS, PRB number, retransmission number, CR limit) sets by using the indexes of the configurations provided in sl-CBR-PSSCH-TxConfigList, CBR ranges by an index to the entry of the CBR range configuration in sl-CBR-RangeConfigList, and priority ranges. It also indicates the default PSSCH transmission parameters to be used when CBR measurement results are not available, and MCS range for the MCS tables used in the resource pool.

SL-CBR-PriorityTxConfigList information element

```
-- ASN1START
-- TAG-SL-CBR-PRIORITYTXCONFIGLIST-START
SL-CBR-PriorityTxConfigList-r16 ::= SEQUENCE (SIZE (1..8)) OF SL-PriorityTxConfigIndex-r16
SL-CBR-PriorityTxConfigList-v1650 ::= SEQUENCE (SIZE (1..8)) OF SL-PriorityTxConfigIndex-v1650
SL-PriorityTxConfigIndex-r16 ::=      SEQUENCE {
    sl-PriorityThreshold-r16                INTEGER (1..8)
OPTIONAL,        -- Need M
    sl-DefaultTxConfigIndex-r16             INTEGER (0..maxCBR-Level-1-r16)
OPTIONAL,        -- Need M
    sl-CBR-ConfigIndex-r16                  INTEGER (0..maxCBR-Config-1-r16)
OPTIONAL,        -- Need M
    sl-Tx-ConfigIndexList-r16               SEQUENCE (SIZE (1..maxCBR-Level-r16)) OF SL-TxConfigIndex-
r16  OPTIONAL    -- Need M
}
SL-PriorityTxConfigIndex-v1650 ::=    SEQUENCE {
    sl-MCS-RangeList-r16                    SEQUENCE (SIZE (1..maxCBR-Level-r16)) OF SL-MinMaxMCS-List-
r16  OPTIONAL    -- Need M
}
SL-TxConfigIndex-r16 ::=              INTEGER (0..maxTxConfig-1-r16)
-- TAG-SL-CBR-PRIORITYTXCONFIGLIST-STOP
-- ASN1STOP
```

SL-CBR-PriorityTxConfigList field descriptions sl-CBR-ConfigIndex
Indicates the CBR ranges to be used by an index to the entry of the CBR range configuration in sl-CBR-RangeConfigList.
sl-DefaultTxConfigIndex
Indicates the PSSCH transmission parameters to be used by the UEs which do not have available CBR measurement results, by means of an index to the corresponding entry in si-Tx-ConfigIndexList. Value 0 indicates the first entry in sl-Tx-ConfigIndexList. The field is ignored if the UE has available CBR measurement results.
sl-MCS-RangeList
Indicates the minimum MCS value and maximum MCS value for the associated MCS table(s). UE shall ignore the minimum MCS value and maximum MCS value used for table of 64QAM indicated in SL-CBR-PriorityTxConfigList-r16 if SL-CBR-PriorityTxConfigList-v1650 is present.
sl-PriorityThreshold
Indicates the upper bound of priority range which is associated with the configurations in sl-CBR-ConfigIndex and in sl-Tx-ConfigIndexList. The upper bounds of the priority ranges are configured in ascending order for consecutive entries of SL-Priority TxConfigIndex in SL-CBR-Priority TxConfigList. For the first entry of SL-PriorityTxConfigIndex, the lower bound of the priority range is 1.
SL-CBR-PriorityTxConfigList-v1650
If included, it includes the same number of entries, and listed in the same order, as in SL-CBR-PriorityTxConfigList-r16.

SL-CBR-CommonTxConfigList

The IE SL-CBR-CommonTxConfigList indicates the list of PSSCH transmission parameters (such as MCS, sub-channel number, retransmission number, CR limit) in sl-CBR-PSSCH-TxConfigList, and the list of CBR ranges in sl-CBR-RangeConfigList, to configure congestion control to the UE for sidelink communication.

| SL-CBR-CommonTxConfigList information element |
| --- |
| -- ASN1START<br>-- TAG-SL-CBR-COMMONTXCONFIGLIST-START<br>SL-CBR-CommonTxConfigList-r16 ::= SEQUENCE {<br>    sl-CBR-RangeConfigList-r16      SEQUENCE (SIZE (1..maxCBR-Config-r16)) OF SL-CBR-LevelsConfig-r16   OPTIONAL,  --Need M<br>    sl-CBR-PSSCH-TxConfigList-r16      SEQUENCE (SIZE (1..maxTxConfig-r16)) OF SL-CBR-PSSCH-TxConfig-r16   OPTIONAL  -- Need M<br>}<br>SL-CBR-LevelsConfig-r16 ::=   SEQUENCE (SIZE (1..maxCBR-Level-r16)) OF SL-CBR-r16<br>SL-CBR-PSSCH-TxConfig-r16 ::=   SEQUENCE {<br>    sl-CR-Limit-r16      INTEGER (0..10000) OPTIONAL,  -- Need M<br>    sl-TxParameters-r16      SL-PSSCH-TxParameters-r16 OPTIONAL  -- Need M<br>}<br>SL-CBR-r16      INTEGER (0..100)<br>-- TAG-SL-CBR-COMMONTXCONFIGLIST-STOP<br>-- ASN1STOP |

| SL-CBR-CommonTxConfigList field descriptions |
| --- |
| sl-CBR-RangeConfigList<br>Each entry in sl-CBR-RangeConfigList is SL-CBR-LevelsConfig containing the list of CBR ranges. The values within each SL-CBR-LevelsConfig indicate the upper bound of the each CBR range (and implicitly indicate the lower bound of next CBR range) and are configured in ascending order. For the first CBR range of each SL-CBR-LevelsConfig, the lower bound of the CBR range is 0. Value 0 corresponds to 0, value 1 to 0.01, value 2 to 0.02, and so on.<br>sl-CR-Limit<br>Indicates the maximum limit on the occupancy ratio. Value 0 corresponds to 0, value 1 to 0.0001, value 2 to 0.0002, and so on (i.e. in steps of 0.0001) until value 10000, which corresponds to 1.<br>sl-CBR-PSSCH-TxConfigList<br>Indicates the list of available PSSCH transmission parameters (such as MCS, sub-channel number, retransmission number and CR limit) configurations. |

| SL-CBR-CommonTxConfigList field descriptions |
| --- |
| sl-TxParameters<br>Indicates PSSCH transmission parameters. |

SL-CBR-CommonTxDedicated-SL-PRS-RP-List

The IE SL-CBR-CommonTxConfigListDedicated-SL-PRS-RP indicates the list of SL PRS transmission parameters (such as Maximum SL PRS transmission power, Maximum Number of SL PRS (re-)transmissions, and CR limit) in sl-CBR-SL-PRS-TxConfigList, and the list of CBR ranges in sl-CBR-RangeConfigList-Dedicated-SL-PRS-RP, to configure congestion control to the UE for sidelink positioning.

| SL-CBR-CommonTxDedicatedSL-PRS-RP-List information element |
| --- |
| -- ASN1START<br>-- TAG- SL-CBR-COMMONTXDEDICATEDSL-PRS-RP-LIST-START<br>SL-CBR-CommonTxDedicatedSL-PRS-RP-List-r18 ::= SEQUENCE {<br>    sl-CBR-RangeDedicatedSL-PRS-RP-List-r18      SEQUENCE (SIZE (1..maxCBR-ConfigDedSL-PRS-1-r18)) OF SL-CBR-LevelsDedicatedSL-PRS-RP-r18 OPTIONAL,  -- Need M<br>    sl-CBR-SL-PRS-TxConfigList-r18      SEQUENCE (SIZE (1.. maxNrofSL-PRS-TxConfig-r18)) OF SL-CBR-SL-PRS-TxConfig-r18 OPTIONAL  -- Need M<br>}<br>SL-CBR-LevelsDedicatedSL-PRS-RP-r18 ::= SEQUENCE (SIZE (0..maxCBR-LevelDedSL-PRS-1-r18)) OF SL-CBR-Dedicated-SL-PRS-RP-r18<br>SL-CBR-SL-PRS-TxConfig-r18 ::=   SEQUENCE {<br>    sl-PRS-CR-Limit-r18      INTEGER (0..10000) OPTIONAL,  -- Need M<br>    sl-PRS-MaxTx-power-r18      INTEGER (-30..33) OPTIONAL,  -- Need M<br>    sl-PRS-MaxNum-Transmissions-r18      INTEGER (1..32) OPTIONAL  -- Need M<br>}<br>SL-CBR-Dedicated-SL-PRS-RP-r18 ::= INTEGER (0..100)<br>-- TAG-SL-CBR-COMMONTXDEDICATEDSL-PRS-RP-LIST-STOP<br>-- ASN1STOP |

| SL-CBR-CommonTxDedicatedSL-PRS-RP-List field descriptions |
| --- |
| sl-CBR-RangeDedicatedSL-PRS-RP-List
Indicates the list of CBR ranges. Each entry of the list indicates in SL-CBR-LevelsConfig-Dedicated-SL-PRS-RP the upper bound of the CBR range for the respective entry. The upper bounds of the CBR ranges are configured in ascending order for consecutive entries of SL-CBR-LevelsConfig-Dedicated-SL-PRS-RP. For the first entry of SL-CBR-LevelsConfig-Dedicated-SL-PRS-RP the lower bound of the CBR range is 0. Value 0 corresponds to 0, value 1 to 0.01, value 2 to 0.02, and so on.
sl-CBR-SL-PRS-TxConfigList
Indicates the list of available SL PRS transmission parameters configurations.
sl-PRS-CR-Limit
Indicates the maximum limit on the occupancy ratio. Value 0 corresponds to 0, value 1 to 0.0001, value 2 to 0.0002, and so on (i.e. in steps of 0.0001) until value 10000, which corresponds to 1. |

-continued

| SL-CBR-CommonTxDedicatedSL-PRS-RP-List field descriptions |
| --- |
| sl-PRS-MaxNum-Transmissions
Indicates maximum Number of SL PRS (re-)transmissions.
sl-PRS-MaxTx-power
Indicates maximum SL PRS transmission power. The unit is dBm. |

SL-PSSCH-TxConfigList

The IE SL-PSSCH-TxConfigList indicates PSSCH transmission parameters. When lower layers select parameters from the range indicated in IE SL-PSSCH-TxConfigList, the UE considers both configurations in IE SL-PSSCH-TxConfigList and the CBR-dependent configurations represented in IE SL-CBR-PriorityTxConfigList. Only one IE SL-PSSCH-TxConfig is provided per SL-TypeTxSync.

| SL-PSSCH-TxConfigList information element |
| --- |
| ```
-- ASN1START
-- TAG-SL-PSSCH-TXCONFIGLIST-START
SL-PSSCH-TxConfigList-r16 ::=    SEQUENCE (SIZE (1..maxPSSCH-TxConfig-r16)) OF SL-PSSCH-TxConfig-r16
SL-PSSCH-TxConfig-r16 ::=        SEQUENCE {
    sl-TypeTxSync-r16                SL-TypeTxSync-r16                           OPTIONAL,
-- Need R
    sl-ThresUE-Speed-r16             ENUMERATED {kmph60, kmph80, kmph100, kmph120,
                                                  kmph140, kmph160, kmph180, kmph200},
    sl-ParametersAboveThres-r16      SL-PSSCH-TxParameters-r16,
    sl-ParametersBelowThres-r16      SL-PSSCH-TxParameters-r16,
    ...,
    [[
    sl-ParametersAboveThres-v1650    SL-MinMaxMCS-List-r16                       OPTIONAL,
-- Need R
    sl-ParametersBelowThres-v1650    SL-MinMaxMCS-List-r16                       OPTIONAL
-- Need R
    ]]
}
SL-PSSCH-TxParameters-r16 ::=    SEQUENCE {
    sl-MinMCS-PSSCH-r16              INTEGER (0..27),
    sl-MaxMCS-PSSCH-r16              INTEGER (0..31),
    sl-MinSubChannelNumPSSCH-r16     INTEGER (1..27),
    sl-MaxSubchannelNumPSSCH-r16     INTEGER (1..27),
    sl-MaxTxTransNumPSSCH-r16        INTEGER (1..32) ,
    sl-MaxTxPower-r16                SL-TxPower-r16                              OPTIONAL
-- Cond CBR
}
-- TAG-SL-PSSCH-TXCONFIGLIST-STOP
-- ASN1STOP
``` |

| SL-PSSCH-TxConfigList field descriptions |
| --- |
| sl-MaxTxTransNumPSSCH
Indicates the maximum transmission number (including new transmission and retransmission) for PSSCH.
.. |

SL-PRS-ResourcePool

The IE SL-PRS-ResourcePool specifies the configuration information for NR sidelink PRS dedicated resource pool.

| SL-PRS-ResourcePool information element |
| --- |
| ```
-- ASN1START
-- TAG-SL-PRS-RESOURCEPOOL-START
SL-PRS-ResourcePool-r18 ::=              SEQUENCE {
    sl-PRS-PSCCH-Config-r18                  SetupRelease { SL-PSCCH-ConfigDedicatedSL-PRS-RP-
r18}              OPTIONAL,  -- Need M
    sl-StartRB-SubchannelDedicatedSL-PRS-RP-r18   INTEGER (0..265)
OPTIONAL,  -- Need M
    sl-RB-Number-r18                         INTEGER (10..275)
OPTIONAL,  -- Need M
``` |

-continued

| SL-PRS-ResourcePool information element | |
|---|---|
| sl-TimeResource-r18<br>OPTIONAL,  -- Need M | BIT STRING (SIZE (10..160)) |
| sl-PosAllowedResourceSelectionConfig-r18<br>OPTIONAL,  -- Need M | ENUMERATED {c1, c2, c3} |
| sl-PRS-ResourceReservePeriodList-r18<br>ReservationPeriodAllowedDedicatedSL-PRS-RP-r18<br>OPTIONAL, | SEQUENCE (SIZE (1..16)) OF SL- |
| sl-PRS-ResourcesDedicatedSL-PRS-RP-r18<br>ResourceDedicatedSL-PRS-RP-r18 OPTIONAL,   -- Need M | SEQUENCE (SIZE (1..12)) OF SL-PRS- |
| sl-PRS-PowerControl-r18<br>OPTIONAL,  -- Need M | SL-PRS-PowerControl-r18 |
| sl-SensingWindowDedicatedSL-PRS-RP-r18<br>OPTIONAL,  -- Need M | ENUMERATED {ms100, ms1100} |
| sl-TxPercentageDedicatedSL-PRS-RP-List-r18<br>PRS-RP-Config-r18 OPTIONAL, -- Need M | SEQUENCE (SIZE (8)) OF SL-TxPercentageDedicatedSL- |
| sl-SCI-basedSL-PRS-TxTriggerSCI1-B-r18<br>OPTIONAL,  -- Need M | BOOLEAN |
| sl-NumSubchannelDedicatedSL-PRS-RP-r18<br>OPTIONAL,  -- Need M | INTEGER (1..27) |
| sl-SubchannelSizeDedicatedSL-PRS-RP-r18<br>OPTIONAL,  -- Need M | ENUMERATED {n10, n12, n15, n20, n25, n50, n75, n100} |
| sl-MaxNumPerReserveDedicatedSL-PRS-RP-r18<br>OPTIONAL,  -- Need M | ENUMERATED {n2, n3} |
| sl-NumReservedBitsSCI1B-DedicatedSL-PRS-RP-r18<br>OPTIONAL,  -- Need M | INTEGER (0..20) |
| sl-SRC-ID-LenDedicatedSL-PRS-RP-r18<br>OPTIONAL,  -- Need M | ENUMERATED {n12, n24} |
| sl-CBR-PriorityTxConfigDedicatedSL-PRS-RP-List-r18 SEQUENCE (SIZE (1..8)) OF SL-<br>PriorityTxConfigIndexDedicatedSL-PRS-RP-r18<br>OPTIONAL,  -- Need M | |
| ...<br>}<br>...<br>SL-PriorityTxConfigIndexDedicatedSL-PRS-RP-r18 ::= SEQUENCE { | |
| sl-PriorityThresholdDedicatedSL-PRS-RP-r18<br>OPTIONAL,  -- Need M | INTEGER (1..8) |
| sl-DefaultTxConfigIndexDedicatedSL-PRS-RP-r18<br>OPTIONAL,  -- Need M | INTEGER (0..maxCBR-LevelDedSL-PRS-1-r18) |
| sl-CBR-ConfigIndexDedicatedSL-PRS-RP-r18<br>OPTIONAL,  -- Need M | INTEGER (0..maxCBR-ConfigDedSL-PRS-1-r18) |
| sl-PRS-TxConfigIndexList-r18<br>r18)) OF SL-PRS-TxConfigIndex-r18<br>OPTIONAL   -- Need M<br>}<br>SL-PRS-TxConfigIndex-r18 ::=     INTEGER (0.. maxNrofSL-PRS-TxConfig-r18)<br>-- TAG-SL-PRS-RESOURCEPOOL-STOP<br>-- ASN1STOP | SEQUENCE (SIZE (1.. maxCBR-LevelDedSL-PRS-1- |

| SL-PRS-ResourcePool field descriptions |
|---|
| ..<br>sl-PosAllowedResourceSelectionConfig<br>Indicates allowed resource allocation method configured per resource pool.<br>C1: only sensing allowed<br>c2: only random resource selection allowed<br>c3: sensing and random resource selection allowed<br>sl-PRS-ResourceReservePeriodList<br>Indicates set of possible resource reservation period in the unit of ms allowed in the resource pool. Up to 16 values can be configured per resource pool. The possible resource reservation period are periodicities for legacy SL communication and the ones defined for DL-PRS.<br>...<br>sl-DefaultTxConfigIndexDedicatedSL-PRS-RP<br>Indicates the SL PRS transmission parameters to be used by the |

-continued

| SL-PRS-ResourcePool field descriptions |
|---|
| UEs which do not have available CBR measurement results, by means of an index to the corresponding entry in sl-PRS-TxConfigIndexList. Value 0 indicates the first entry in sl-PRS-Tx-ConfigIndexList. The field is ignored if the UE has available CBR measurement results.<br>sl-CBR-ConfigIndexDedicatedSL-PRS-RP<br>Indicates the CBR ranges to be used by an index to the entry of the CBR range configuration in sl-CBR-RangeConfigList-Dedicated-SL-PRS-RP.<br>... |

SL-ResourcePool

The IE SL-ResourcePool specifies the configuration information for NR sidelink communication resource pool.

| SL-ResourcePool information element |
|---|
| -- ASN1START<br>-- TAG-SL-RESOURCEPOOL-START<br>SL-ResourcePool-r16 :: =                   SEQUENCE { |

| SL-ResourcePool information element |  |
| --- | --- |
| sl-PSCCH-Config-r16<br>OPTIONAL,  -- Need M | SetupRelease { SL-PSCCH-Config-r16 } |
| sl-PSSCH-Config-r16<br>OPTIONAL,  -- Need M | SetupRelease { SL-PSSCH-Config-r16 } |
| sl-PSFCH-Config-r16<br>OPTIONAL,  -- Need M | SetupRelease { SL-PSFCH-Config-r16 } |
| ... |  |
| sl-UE-SelectedConfigRP-r16<br>OPTIONAL,  -- Need M | SL-UE-SelectedConfigRP-r16 |
| ... |  |
| sl-PRS-ResourcesSharedSL-PRS-RP-r18<br>OPTIONAL,  -- Need M | SEQUENCE (SIZE (1..17)) OF SL-PRS-ResourceSharedSL-PRS-RP-r18 |
| numSym-SL-PRS-2ndStageSCI-r18<br>OPTIONAL,  -- Need M | INTEGER (1..4) |
| sl-SCI-based-SL-PRS-Tx-Trigger-SCI2-D-r18 BOOLEAN<br>OPTIONAL,  -- Need M |  |
| sl-TriggerConditionRequest-r17<br>OPTIONAL   -- Need M | INTEGER (0..1) |
| ]]<br>} |  |
| ... |  |
| SL-UE-SelectedConfigRP-r16 ::= | SEQUENCE { |
| sl-CBR-PriorityTxConfigList-r16<br>OPTIONAL,  -- Need M | SL-CBR-PriorityTxConfigList-r16 |
| sl-Thres-RSRP-List-r16<br>OPTIONAL,  -- Need M | SL-Thres-RSRP-List-r16 |
| sl-MultiReserveResource-r16<br>OPTIONAL,  -- Need M | ENUMERATED {enabled} |
| sl-MaxNumPerReserve-r16<br>OPTIONAL,  -- Need M | ENUMERATED {n2, n3} |
| sl-SensingWindow-r16<br>OPTIONAL,  -- Need M | ENUMERATED {ms100, ms1100} |
| sl-SelectionWindowList-r16<br>OPTIONAL,  -- Need M | SL-SelectionWindowList-r16 |
| sl-ResourceReservePeriodList-r16<br>OPTIONAL,  -- Need M | SEQUENCE (SIZE (1..16)) OF SL-ResourceReservePeriod-r16 |
| sl-RS-ForSensing-r16 | ENUMERATED {pscch, pssch}, |
| ...,<br>[[<br>sl-CBR-PriorityTxConfigList-v1650<br>OPTIONAL   -- Need M | SL-CBR-PriorityTxConfigList-v1650 |
| ]],<br>...<br>} |  |
| ... |  |
| SL-PRS-ResourceSharedSL-PRS-RP-r18 ::= SEQUENCE { |  |
| sl-PRS-ResourceID-r18<br>OPTIONAL,  -- Need M | INTEGER (0..16) |
| mNumberOf Symbols-r18<br>OPTIONAL,  -- Need M | INTEGER (1..9) |
| nCombSize-r18<br>OPTIONAL,  -- Need M | ENUMERATED {n2,n4,n6} |
| sl-PRS-starting-symbol-r18<br>OPTIONAL,  -- Need M | INTEGER (4..12) |
| sl-PRS-comb-offset-r18<br>OPTIONAL  -- Need M | INTEGER (1..5) |
| }<br>-- TAG-SL-RESOURCEPOOL-STOP<br>-- ASN1STOP |  |

Editor's note: The value range of sl-PSFCH-PowerOffset may need to be updated based on RAN4 reply LS.

| SL-ZoneConfigMCR field descriptions |
| --- |
| sl-TransRange<br>Indicates the communication range requirement for the corresponding sl-ZoneConfigMCR-Index. The unit is meter.<br>sl-ZoneConfig<br>Indicates the zone configuration for the corresponding sl-ZoneConfigMCR-Index.<br>sl-ZoneConfigMCR-Index<br>Indicates the codepoint of the communication range requirement field in SCI. |

| SL-ResourcePool field descriptions |
| --- |
| ...<br>sl-PRS-ResourcesSharedSL-PRS-RP<br>Indicates SL PRS resources in a slot of shared SL PRS resource pool as defined in TS 38.211 [16].<br>... |

| SL-UE-SelectedConfigRP field descriptions |
| --- |
| sl-CBR-PriorityTxConfigList<br>Indicates the mapping between PSSCH transmission parameter |

| SL-UE-SelectedConfigRP field descriptions |
|---|
| (such as MCS, PRB number, retransmission number, CR limit) sets by using the indexes of the configurations in sl-CBR-PSSCH-TxConfigList, CBR ranges by using the indexes to the entry of the CBR range configurations in sl-CBR-RangeConfigList, and priority ranges. It also indicates the default PSSCH transmission parameters to be used when CBR measurement results are not available, and MCS range for the MCS tables used in the resource pool. The field sl-CBR-PriorityTxConfigList-v1650 is present only when sl-CBR-PriorityTxConfigList-r16 is configured. sl-MaxNumPerReserve Indicates the maximum number of reserved PSCCH/PSSCH resources that can be indicated by an SCI. sl-MultiReserveResource Indicates if it is allowed to reserve a sidelink resource for an initial transmission of a TB by an SCI associated with a different TB, based on sensing and resource selection procedure. ... |

SL-UE-SelectedConfig

IE SL-UE-SelectedConfig specifies sidelink communication configurations used for UE autonomous resource selection.

| SL-UE-SelectedConfig information element |
|---|
| ```
-- ASN1START
-- TAG-SL-UE-SELECTEDCONFIG-START
SL-UE-SelectedConfig-r16 ::=          SEQUENCE {
  sl-PSSCH-TxConfigList-r16              SL-PSSCH-TxConfigList-r16
OPTIONAL,  -- Need R
  sl-ProbResourceKeep-r16                ENUMERATED {v0, v0dot2, v0dot4, v0dot6, v0dot8}
OPTIONAL,  -- Need R
  sl-ReselectAfter-r16                   ENUMERATED {n1, n2, n3, n4, n5, n6, n7, n8, n9}
OPTIONAL,  -- Need R
  sl-CBR-CommonTxConfigList-r16          SL-CBR-CommonTxConfigList-r16
OPTIONAL,  -- Need R
  ul-PrioritizationThres-r16             INTEGER (1..16)
OPTIONAL,  -- Need R
  sl-PrioritizationThres-r16             INTEGER (1..8)
OPTIONAL,  -- Need R
  ...
}
-- TAG-SL-UE-SELECTEDCONFIG-STOP
-- ASN1STOP
``` |

| SL-UE-SelectedConfig field descriptions |
|---|
| sl-Prioritization Thres Indicates the SL priority threshold, which is used to determine whether SL TX is prioritized over UL TX, as specified in TS 38.321 [3]. Network does not configure the sl-PrioritizationThres and the ul-PrioritizationThres to the UE separately. sl-ProbResourceKeep Indicates the probability with which the UE keeps the current resource when the resource reselection counter reaches zero for sensing based UE autonomous resource selection (see TS 38.321 [3]). sl-PSSCH-TxConfigList Indicates PSSCH TX parameters such as MCS, sub-channel number, retransmission number, associated to different UE absolute speeds and different synchronization reference types for UE autonomous resource selection. sl-ReselectAfter Indicates the number of consecutive skipped transmissions before triggering resource reselection for sidelink communication (see TS 38.321 [3]). ul-Prioritization Thres Indicates the UL priority threshold, which is used to determine whether SL TX is prioritized over UL TX, as specified in TS 38.321 [3]. Network does not configure the sl-PrioritizationThres and the ul-PrioritizationThres to the UE separately. |

**************************QUOTATION [4] END****************************

In [5]3GPP TS 38.321 V18.0.0 (2023-12), SL-PRS related procedures in MAC layer are specified.
**************************QUOTATION [5] START**************************

3.1 Definitions

For the purposes of the present document, the terms and definitions given in TR 21.905 [1] and the following apply. A term defined in the present document takes precedence over the definition of the same term, if any, in TR 21.905 [1].

. . .

NR sidelink communication: AS functionality enabling at least V2X Communication as defined in TS 23.287 [19] and ProSe communication (including ProSe non-Relay, UE-to-Network Relay and UE-to-UE Relay communication (including ProSe UE-to-UE Relay communication with integrated discovery)) as defined in TS 23.304 [26], between two or more nearby UEs, using NR technology but not traversing any network node.

NR sidelink discovery: AS functionality enabling ProSe non-Relay discovery, ProSe UE-to-Network Relay discovery and ProSe UE-to-UE Relay discovery for Proximity based Services as defined in TS 23.304 [26], between two or more nearby UEs, using NR technology but not traversing any network node.

NR sidelink transmission: Any NR Sidelink-based transmission, including transmission for NR sidelink discovery, transmission for NR sidelink communication, transmission of SL-PRS, and transmission for A2X communication.

. . .

Ranging/Sidelink Positioning: AS functionality enabling ranging-based services and sidelink positioning as specified in TS 23.586 [30].

. . .

Serving Cell: A PCell, a PSCell, or an SCell in TS 38.331 [5].

Sidelink transmission information: Sidelink transmission information included in an SCI for an SL-SCH transmission or SL-PRS transmission with or without SL-SCH transmission on SL-PRS shared resource pool as specified in clause 8.3 and 8.4 of TS 38.212 [9] consists of Sidelink HARQ information including NDI, RV, Sidelink process ID, HARQ feedback enabled/disabled indicator, Sidelink identification information including cast type indicator, Source Layer-1 ID and Destination Layer-1 ID, and Sidelink other information including CSI request, SL-PRS request, SL-PRS resource ID, a priority, a communication range requirement and Zone ID.

SL-PRS delay budget: Delay budget before which the SL-PRS is expected to be transmitted by the Tx UE.

SL-PRS dedicated resource pool: A sidelink resource pool which can be used for the transmission of SL-PRS and cannot be used for the transmission of PSSCH.

SL-PRS shared resource pool: A sidelink resource pool which can be used for the transmission of both SL-PRS and PSSCH.

SL-PRS transmission information on SL-PRS dedicated resource pool: SL-PRS transmission information on SL-PRS dedicated resource pool is included in an SCI for an SL-PRS transmission on SL-PRS dedicated resource pool, as specified in TS 38.212 [9], consisting of SL-PRS identification information, including cast type indicator, source ID and destination ID;

SL-PRS transmission other information, including SL-PRS priority, SL-PRS request, SL-PRS resource ID and resource reservation period.

. . .

5.22 SL-SCH Data Transfer and SL-PRS Transmission
5.22.1 SL-SCH Data and SL-PRS Transmission
5.22.1.1 SL Grant Reception and SCI Transmission Sidelink grant is received dynamically on the PDCCH, configured semi-persistently by RRC or autonomously selected by the MAC entity. The MAC entity may have a sidelink grant on an active SL BWP to determine a set of PSCCH duration(s) in which transmission of SCI occurs and a set of PSSCH duration(s) in which transmission of SL-SCH associated with the SCI occurs. The MAC entity may have a sidelink grant on the SL-PRS shared resource pool of an active BWP to determine a set of PSCCH durations(s) in which transmission of SCI occurs and a set of SL-PRS transmission occasion(s) and PSSCH duration(s) in which transmission of SL-PRS and SL-SCH associated with the SCI occur. The MAC entity may have a sidelink grant on the SL-PRS dedicated resource pool of an active BWP to determine a set of PSCCH duration(s) in which transmission of SCI occurs and a set of SL-PRS transmission occasion(s) in which transmission of SL-PRS associated to the SCI occurs . . . .

. . .

If the MAC entity has been configured with Sidelink resource allocation mode 2 to transmit or Sidelink resource allocation scheme 2 using pool(s) of resources in one or multiple carriers as indicated in TS 38.331 [5] or TS 36.331 [21] based on full sensing, or partial sensing, or random selection or any combination(s), the MAC entity shall for each Sidelink process:
NOTE 0A: For SL-PRS transmission by Sidelink resource allocation scheme 2 on SL-PRS dedicated resource pool, partial sensing is not supported.
NOTE 1: If the MAC entity is configured with Sidelink resource allocation mode 2 or Sidelink resource allocation scheme 2 to transmit using a pool of resources in one or multiple carriers as indicated in TS 38.331 [5] or TS 36.331 [21], the MAC entity can create a selected sidelink grant on the pool of resources based on random selection, or partial sensing, or full sensing only after releasing configured sidelink grant(s), if any.

. . .

The MAC entity shall for each PSCCH duration on SL-PRS dedicated resource pool:

1> if the MAC entity is not configured with multiple SL-PRS transmissions with Sidelink resource allocation scheme 2; or
1> if the MAC entity is configured with Sidelink resource allocation scheme 1:
  2> set the resource reservation period to 0.
1> else if the MAC entity is configured with multiple SL-PRS transmission with Sidelink resource allocation scheme 2:
  2> set the resource reservation period to the selected value.
1> if the configured sidelink grant has been activated and this PSSCH duration corresponds to the first PSSCH transmission opportunity within this sl-PeriodCG of the configured sidelink grant:
  2> set the SL-PRS Process ID to the SL-PRS Process ID associated with this PSSCH duration and, if available, all subsequent SL-PRS transmission occasion(s) occurring in this sl-PeriodCG for the configured sidelink grant;
  2> determine that this SL-PRS transmission occasion is used for initial transmission.
1> process the sidelink grant according to clause 5.22.1.3.4 with the corresponding SL-PRS transmission information.

For configured sidelink grants not on SL-PRS dedicated resource pool, the HARQ Process ID associated with the first slot of an SL transmission is derived from the following equation:

$$\text{HARQ Process ID}=[\text{floor}(\text{CURRENT\_slot}/\text{PeriodicitySL})]\text{modulo sl-NrOfHARQ-Processes}+\text{sl-HARQ-ProcID-offset}$$

For configured sidelink grant on SL-PRS dedicated resource pool, the SL-PRS Process ID associated with the first slot of an SL transmission is derived from the following equation:

$$\text{SL-PRS Process ID}=[\text{floor}(\text{CURRENT\_slot}/\text{PeriodicitySL})]\text{modulo}[\text{nrOfSL-PRSProc}]$$

where CURRENT_slot refers to current logical slot in the associated resource pool, and PeriodicitySL is defined in clause 5.8.3.

. . .

5.22.1.3 Sidelink HARQ Operation and SL-PRS Transmission
5.22.1.3.1 Sidelink HARQ Entity The MAC entity is configured by upper layers to transmit using pool(s) of resources on one or more carriers as indicated in clause 5.8.8 of TS 38.331 [5]. For each carrier, the MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or
1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent:
NOTE 1: Void.
    2> (re-)associate a Sidelink process to this grant, and for the associated Sidelink process:
    2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:
        3> ignore the sidelink grant.
NOTE 1A: The Sidelink HARQ Entity will associate the selected sidelink grant to the Sidelink process determined by the MAC entity.
    2> else:
        3> obtain the MAC PDU and SL-PRS, if any, to transmit from the Multiplexing and assembly entity, if any;
        3> if a MAC PDU to transmit has been obtained:
            4> if a HARQ Process ID has been set for the sidelink grant:
                5> (re-)associate the HARQ Process ID corresponding to the sidelink grant to the Sidelink process.
NOTE 1a: There is one-to-one mapping between a HARQ Process ID and a Sidelink process in the MAC entity configured with Sidelink resource allocation mode 1.
            4> determines Sidelink transmission information of the TB for the source and destination pair of the MAC PDU as follows:
                5> set the Source Layer-1 ID to the 8 LSB of the Source Layer-2 ID of the MAC PDU;
                5> set the Destination Layer-1 ID to the 16 LSB of the Destination Layer-2 ID of the MAC PDU;
                5> (re-)associate the Sidelink process to a Sidelink process ID;
NOTE 1b: How UE determine Sidelink process ID in SCI is left to UE implementation for NR sidelink.
                5> consider the NDI to have been toggled compared to the value of the previous transmission corresponding to the Sidelink identification information and the Sidelink process ID of the MAC PDU and set the NDI to the toggled value;
NOTE 2: The initial value of the NDI set to the very first transmission for the associated Sidelink process is left to UE implementation.
NOTE 3: Void.
                5> if the MAC PDU is for NR sidelink discovery:
                    6> set the cast type indicator to broadcast.
                5> else:
                    6> set the cast type indicator to one of broadcast, groupcast and unicast as indicated by upper layers.
                5> if HARQ feedback has been enabled for the MAC PDU according to clause 5.22.1.4.2;
                    6> set the HARQ feedback enabled/disabled indicator to enabled.
                5> else:
                    6> set the HARQ feedback enabled/disabled indicator to disabled.
                5> set the priority to the value of the highest priority of the logical channel(s), if any, and MAC CE(s), if included, in the MAC PDU and SL-PRS, if any;
NOTE 3A: When determining Sidelink transmission information, the priority of the Sidelink Inter-UE Coordination Information MAC CE is the value configured in RRC parameters sl-PriorityCoordInfoCondition when triggered by a condition, or sl-PriorityCoordinfoExplicit when triggered by an explicit request. When determining Sidelink transmission information, the priority of the Sidelink Inter-UE Coordination Request MAC CE is the value configured in RRC parameter sl-PriorityRequest. When determining Sidelink transmission information, the priority of the Sidelink Inter-UE Coordination Information MAC CE is the value indicated in Priority field in the Sidelink Inter-UE Coordination Request MAC CE provided by the UE when triggered by an explicit request, if sl-PriorityCoordinfoExplicit-r17 is not configured. When determining Sidelink transmission information for performing sensing and candidate resource selections in PHY, the priority value of the Sidelink Inter-UE Coordination Information MAC CE triggered under a condition is up to UE implementation, if sl-PriorityCoordlnfoCondition-r17 is not configured. When determining Sidelink transmission information for performing sensing and candidate resource selections in PHY, the priority value of Sidelink Inter-UE Coordination Request MAC CE is the same as that of a TB to be transmitted by the UE, if sl-PriorityRequest-r17 is not configured.
                5> if HARQ feedback is enabled for groupcast:
                    6> if both a group size and a member ID are provided by upper layers and the group size is not greater than the number of candidate PSFCH resources in a slot associated with this sidelink grant:
                        7> select either positive-negative acknowledgement or negative-only acknowledgement.
NOTE 4: Selection of positive-negative acknowledgement or negative-only acknowledgement is up to UE implementation.
                    6> else:
                        7> select negative-only acknowledgement.
NOTE 5: UE operating in SL unlicensed does not use negative-only acknowledgement for groupcast HARQ.
                    6> if negative-only acknowledgement is selected, UE's location information is available, and sl-TransRange has been configured for a logical channel in the MAC PDU, and sl-ZoneConfig is configured as specified in TS 38.331 [5]:
                        7> set the communication range requirement to the value of the longest communication range of the logical channel(s) in the MAC PDU;
                        7> determine the value of sl-ZoneLength corresponding to the communication range requirement and set Zone_id to the value of Zone_id calculated using the determined value of sl-ZoneLength as specified in TS 38.331 [5].
                5> set the Redundancy version to the selected value.
                5> if the sidelink grant is associated with request from the higher layer for triggering the SL-PRS transmission of the peer UE identified by the Destination layer-2 ID:
   6> set the SL-PRS request to request.
   5> set the SL-PRS resource ID, if SL-PRS is available, within Sidelink transmission information.
  4> deliver the MAC PDU, the SL-PRS, if available, the sidelink grant and the Sidelink transmission information of the TB to the associated Sidelink process;
  4> instruct the associated Sidelink process to trigger a new transmission.
 3> else:
  4> flush the HARQ buffer of the associated Sidelink process.
1> else (i.e. retransmission):
 2> if the HARQ Process ID corresponding to the sidelink grant received on PDCCH, the configured sidelink grant or the selected sidelink grant is associated to a Sidelink process of which HARQ buffer is empty; or
 2> if the HARQ Process ID corresponding to the sidelink grant received on PDCCH is not associated to any Sidelink process; or
 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:
  3> ignore the sidelink grant.
 2> else:
  3> identify the Sidelink process associated with this grant, and for the associated Sidelink process:
   4> deliver the sidelink grant of the MAC PDU and the SL-PRS, if available, to the associated Sidelink process;
   4> instruct the associated Sidelink process to trigger a retransmission.

5.22.1.3.1a Sidelink Process not Associated with SL-PRS Dedicated Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:
 1> store the MAC PDU in the associated HARQ buffer;
 1> store the sidelink grant received from the Sidelink HARQ Entity;
 1> generate a transmission as described below.

If the Sidelink HARQ Entity requests a retransmission, the Sidelink process shall:
 1> store the sidelink grant received from the Sidelink HARQ Entity;
 1> generate a transmission as described below.

To generate a transmission, the Sidelink process shall:
 1> if there is no uplink transmission; or
 1> if the MAC entity is able to simultaneously perform uplink transmission(s) and sidelink transmission at the time of the transmission; or
 1> if the other MAC entity and the MAC entity are able to simultaneously perform uplink transmission(s) and sidelink transmission at the time of the transmission respectively; or
 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
  2> instruct the physical layer to transmit SCI according to the stored sidelink grant with the associated Sidelink transmission information;
  2> instruct the physical layer to generate a transmission according to the stored sidelink grant;
  2> if HARQ feedback has been enabled for the MAC PDU according to clause 5.22.1.4.2:
   3> instruct the physical layer to monitor PSFCH for the transmission and perform PSFCH reception as specified in clause 5.22.1.3.2.
  2> if sl-PUCCH-Config is configured by RRC for the stored sidelink grant:
   3> determine transmission of an acknowledgement on the PUCCH as specified in clause 5.22.1.3.2.
 1> if this transmission corresponds to the last transmission of the MAC PDU and SL-PRS, if available:
  2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
 1> if a positive acknowledgement to this transmission of the MAC PDU was received according to clause 5.22.1.3.2, except a positive acknowledgement to Multi-consecutive slots transmission (i.e., multiple TBs case) of the MAC PDU and there is remaining slot(s) for this MAC PDU; or
 1> if negative-only acknowledgement was enabled in the SCI and no negative acknowledgement was received for this transmission of the MAC PDU according to clause 5.22.1.3.2:
  2> flush the HARQ buffer of the associated Sidelink process.
. . .

5.22.1.3.4 Processing of Sidelink Grant on SL-PRS Dedicated Resource Pool

For each sidelink grant, the MAC entity shall:
 1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant:
  2> associate a Sidelink process to this sidelink grant;
  2> set the Destination ID to the Destination layer-2 ID corresponding to the SL-PRS transmission;
  2> if the length of the Source ID is configured to as 12 bit:
    3> set the Source ID to the 12 LSB of the Source layer-2 ID corresponding to the SL-PRS transmission;
  2> else if length of the Source ID is configured to as 24 bit:
    3> set the Source ID to the Source layer-2 ID corresponding to the SL-PRS transmission;
  2> set the cast type indicator to one of broadcast, groupcast and unicast as indiated by the upper layer;
  2> set the SL-PRS priority as the value indicated by upper layer;
  2> set the SL-PRS resource ID;
  2> if the higher layer triggers SL-PRS transmission to the peer UE identified by the Destination layer-2 ID:
    3> set the SL-PRS request to request;
  2> deliver the SL-PRS transmission information to the Sidelink process;
  2> instruct the associated Sidelink process to trigger a new transmission as defined in 5.22.1.3.5.
1> else (i.e., retransmission):
  2> identify the Sidelink process associated with this grant;
  2> if sl-PRS-MaxNumTransmissions is configured and the number of transmissions of the SL-PRS has not reached sl-PRS-MaxNumTransmissions:
    3> deliver the same SL-PRS transmission information as the initial transmission to the Sidelink process;
    3> instruct the associated Sidelink process to trigger a retransmission as defined in 5.22.1.3.5.
NOTE: For configured sidelink grant, the Sidelink process for retransmission is identified by the SL-PRS Process ID as specified in clause 5.22.1.3.1.

5.22.1.3.5 Sidelink Process Associated with SL-PRS Dedicated Resource Pool

If the Sidelink process is configured to perform transmissions of multiple SL-PRS with Sidelink resource allocation scheme 2, the process maintains a counter SL_RESOURCE_RESELECTION_COUNTER. For other configurations of the Sidelink process, this counter is not available. For each SL-PRS new transmission or retransmission, the MAC entity shall:
1> if there is no uplink transmission; or
1> if there is uplink transmission and the sidelink transmission is prioritized over uplink transmission:
  2> instruct the physical layer to transmit SCI of the SL grant with the associated SL-PRS transmission information on SL-PRS dedicated resource pool;
  2> instruct the physical layer to generate the SL-PRS on SL-PRS dedicated resource pool.
1> if this transmission corresponds to the last transmission of the SL-PRS transmission:
  2> decrement SL_RESOURCE_RESELECTION_COUNTER by 1, if available.

The transmission of the SL-PRS is prioritized over uplink transmission(s) of the MAC entity or the other MAC entity if the following conditions are met:

1> if the MAC entity is not able to perform this sidelink transmission simultaneously with all uplink transmission(s) at the time of the transmission, and
1> if ul-PrioritizationThres is configured and if the value of the highest priority of logical channel(s) of all the NR uplink transmission(s) is not lower than ul-PrioritizationThres, and
1> if sl-PrioritizationThres is configured and if the value of SL-PRS priority is lower than sl-PrioritizationThres.

5.22.1.4 Multiplexing and Assembly
5.22.1.4.0 General

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

NOTE: Sidelink data for discovery and sidelink data for non-discovery transmitted by a UE cannot be multiplexed into the same TB because they are always associated with different destination L2 IDs (see TS 23.304 [26]).

5.22.1.4.1 Logical Channel Prioritization
5.22.1.4.1.1 General

The sidelink Logical Channel Prioritization procedure is applied whenever a new transmission is performed.

RRC controls the scheduling of sidelink data by signalling for each logical channel:
  sl-Priority where an increasing priority value indicates a lower priority level;
  sl-PrioritisedBitRate which sets the sidelink Prioritized Bit Rate (sPBR);
  sl-BucketSizeDuration which sets the sidelink Bucket Size Duration (sBSD).

5.22.1.4.1.2 Selection of Logical Channels and SL-PRS

The MAC entity shall for each SCI corresponding to a new transmission:
1> if sl-BWP-DiscPoolConfig, sl-BWP-DiscPoolConfigCommon, sl-BWP-PoolConfigA2X or sl-BWP-PoolConfigCommonA2X is configured according to TS 38.331 [5]; and
1> if the new transmission is not associated to a sidelink grant on SL-PRS dedicated resource pool:
  2> if the new transmission is associated to a sidelink grant in sl-DiscTxPoolSelected or sl-DiscTxPoolScheduling configured in sl-BWP-DiscPoolConfig or sl-BWP-DiscPoolConfigCommon:
    3> select a Destination associated with NR sidelink discovery as specified in TS 23.304 [26], that is in the SL Active time for the SL transmission occasion if SL DRX is applied for the destination, and among the logical channels that satisfy all the following conditions for the SL grant associated to the SCI:
      4> SL data for NR sidelink discovery is available for transmission; and
      4> SBj>0, in case there is any logical channel having SBj>0; and
  2> else if the new transmission is associated to a sidelink grant in sl-TxPoolSelectedNormal configured in sl-BWP-PoolConfigA2X or sl-BWP-PoolConfigCommonA2X:
    3> select a Destination associated with BRID if sl-A2X-Service in sl-TxPoolSelectedNormal indicates brid or bridAndDAA or select a Destination associated with DAA if sl-A2X-Service in sl-TxPoolSelectedNormal indicates daa or bridAndDAA as specified in TS 23.256 [31], and the logical channel with the highest priority, among the logical channels that satisfy all the following conditions for the SL grant associated to the SCI:
4> SL data for A2X communication is available for transmission; and
4> SBj>0, in case there is any logical channel having SBj>0.
2> else:
3> select a Destination associated to one of unicast, groupcast and broadcast (excluding the Destination(s) associated with NR sidelink discovery as specified in TS 23.304 [26]), that is in the SL Active time for the SL transmission occasion if SL DRX is applied for the destination, and having at least one of the MAC CE and the logical channel and pending SL-PRS transmission(s) with the highest priority, among the logical channels that satisfy all the following conditions and MAC CE(s), if any, and SL-PRS(s), if any for the SL grant associated to the SCI:
4> SL data for NR sidelink communication is available for transmission; and
4> SBj>0, in case there is any logical channel having SBj>0; and
. . .
1> else:
. . . 2> if the new transmission is not associated to a sidelink grant on SL-PRS dedicated resource pool:
3> select a Destination associated to one of unicast, groupcast and broadcast, that is in the SL Active time for the SL transmission occasion if SL DRX is applied for the destination, and having at least one of the MAC CE and the logical channel and pending SL-PRS transmission(s) with the highest priority, among the logical channels that satisfy all the following conditions and MAC CE(s), if any, and SL-PRS(s), if any, for the SL grant associated to the SCI:
4> SL data is available for transmission; and
4> SBj>0, in case there is any logical channel having SBj>0; and
. . .
NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.
1> else: (i.e., the sidelink grant is associated with SL-PRS dedicated resource pool)
2> select a Destination corresponding to the cast type of the SL grant and having pending SL-PRS transmission(s) with the highest priority for the SL grant associated to the SCI.
1> select the logical channels satisfying all the following conditions among the logical channels belonging to the selected Destination when the UL grant is not associated to a sidelink grant on SL-PRS dedicated resource pool:
2> SL data is available for transmission; and
. . .
5.22.1.4.1.3 Allocation of Sidelink Resources
The MAC entity shall for each sidelink grant associated with SL-PRS shared resource pool:
1> if there is SL-PRS pending for transmission for the selected destination; and 2> if all the SL-SCH data within logical channel with lower priority value than that of the SL-PRS can be allocated with resources when SL-PRS is transmitted:
3> determine that the pending SL-PRS can be transmitted in the sidelink grant.
2> derive the Transport Block Size for a new transmission for SL-SCH according to clause 8.1.3.2 in TS 38.214 [7].
The MAC entity shall for each SCI corresponding to a new transmission for SL-SCH:
1> allocate resources to the logical channels as follows:
2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);
2> decrement SBj by the total size of MAC SDUs served to logical channel j above;
2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.
. . . The MAC entity shall not generate a MAC PDU for the HARQ entity if the following conditions are satisfied:
there is no Sidelink CSI Reporting MAC CE generated for this PSSCH transmission as specified in clause 5.22.1.7; and
there is no Sidelink DRX Command MAC CE generated for this PSSCH transmission as specified in clause 5.22.1.8; and
there is no Sidelink Inter-UE Coordination Request MAC CE generated for this PSSCH transmission as specified in clause 5.22.1.9; and
there is no Sidelink Inter-UE Coordination Information MAC CE generated for this PSSCH transmission as specified in clause 5.22.1.10; and
the MAC PDU includes zero MAC SDUs and the MAC PDU is not associated with SL-PRS transmission on SL-PRS shared resource pool.
. . .
5.22.1.4.2 Multiplexing of MAC Control Elements and MAC SDUs
The MAC entity shall multiplex MAC CEs and MAC SDUs in a MAC PDU according to clauses 5.22.1.4.1 and 6.1.6.
. . .
\*\*\*\*\*\*\*\*\*\*\*\*\*\*\*\*\*\*\*\*\*\*\*\*\*\*\*\*\*\*\*\*\*\*QUOTATION [5] END\*\*\*\*\*\*\*\*\*\*\*\*\*\*\*\*\*\*\*\*\*\*\*\*\*\*\*\*\*\*\*\*\*\*
In [6] RAN1 Chair's Notes of 3GPP TSG RAN WG1 #113, there is a conclusion on sidelink positioning.
\*\*\*\*\*\*\*\*\*\*\*\*\*\*\*\*\*\*\*\*\*\*\*\*\*\*\*\*\*\*\*\*\*\*QUOTATION [6] START\*\*\*\*\*\*\*\*\*\*\*\*\*\*\*\*\*\*\*\*\*\*\*\*\*\*\*\*\*\*\*\*\*\*
Conclusion
Do not support ACK/NACK feedback for SL-PRS or lower-layer feedback-based retransmissions in Release 18.
\*\*\*\*\*\*\*\*\*\*\*\*\*\*\*\*\*\*\*\*\*\*\*\*\*\*\*\*\*\*\*\*\*\*QUOTATION [6] END\*\*\*\*\*\*\*\*\*\*\*\*\*\*\*\*\*\*\*\*\*\*\*\*\*\*\*\*\*\*\*\*\*\*
In [7] RAN1 Chair's Notes of 3GPP TSG RAN WG1 #116, there are some agreements on sidelink positioning.
\*\*\*\*\*\*\*\*\*\*\*\*\*\*\*\*\*\*\*\*\*\*\*\*\*\*\*\*\*\*\*\*\*\*QUOTATION [7] START\*\*\*\*\*\*\*\*\*\*\*\*\*\*\*\*\*\*\*\*\*\*\*\*\*\*\*\*\*\*\*\*\*\*

Agreement

To the following question from RAN2 in R1-2400008, RAN1 to respond as below:

Question from RAN2:
On the maximum number of parallel SL-PRS transmission
What is the maximum total number of parallel SL-PRS transmission on SL-PRS shared/dedicated resource pool?

RAN1's response: While the interpretation intended by RAN2 for "parallel SL PRS transmission" is not fully clear, RAN1 understands that it is referring to the number of processes similar to the number of SL processes associated with a SL HARQ entity for SL communications. There is no concept of parallel SL PRS transmission processes defined/used in RAN1 and such a concept is expected to be transparent to RAN1 specifications. Accordingly, the maximum total number of parallel SL PRS transmission in a shared/dedicated SL PRS resource pool can be up to RAN2.

Agreement

To the following question from RAN2 in R1-2400008, RAN1 to respond as below:

Question from RAN2:
On the maximum number of parallel SL-PRS transmission
What is the maximum number of parallel SL-PRS transmission supported on a SL-PRS shared resource pool and SL-PRS dedicated resource pool, respectively?

RAN1's response: Following from the response to the first question, the maximum number of parallel SL PRS transmission in a shared/dedicated SL PRS resource pool respectively can be up to RAN2.

Agreement

To the following question from RAN2 in R1-2400008, RAN1 to respond as below:

Question from RAN2:
When SL-PRS is transmitted on a SL-PRS shared resource pool where PSFCH is configured, if the associated PSSCH transmission is positively acknowledged, should the UE continue to perform SL-PRS retransmission?

RAN1's response: Since there is no notion of Layer 1 feedback in response to SL PRS transmission, a positive acknowledgement for an associated PSSCH may not be interpreted to indicate successful reception of SL PRS (see RAN1 conclusion from RAN1 #113 below). Accordingly, a Tx UE may continue to perform SL PRS retransmissions if it has been provided with multiple resources for (re-)transmission by the MAC layer, subject to any restrictions on the maximum number of retransmissions.

| Conclusion |
| --- |
| Do not support ACK/NACK feedback for SL-PRS or lower-layer feedback-based retransmissions in Release 18. |

\*\*\*\*\*\*\*\*\*\*\*\*\*\*\*\*\*\*\*\*\*\*\*\*\*\*\*\*\*\*\*\*\*QUOTATION [7] END\*\*\*\*\*\*\*\*\*\*\*\*\*\*\*\*\*\*\*\*\*\*\*\*\*\*\*\*\*\*\*\*\*

In [8]R1-2401552, the following is quoted.
\*\*\*\*\*\*\*\*\*\*\*\*\*\*\*\*\*\*\*\*\*\*\*\*\*\*\*\*\*\*\*\*\*QUOTATION [8] START\*\*\*\*\*\*\*\*\*\*\*\*\*\*\*\*\*\*\*\*\*\*\*\*\*\*\*\*\*\*\*\*\*

RAN1 has discussed the questions in the RAN2 LS and would like to reply as below.

Question 1a (RAN2):
On the maximum number of parallel SL-PRS transmission
What is the maximum total number of parallel SL-PRS transmission on SL-PRS shared/dedicated resource pool?

RAN1's response:
While the interpretation intended by RAN2 for "parallel SL PRS transmission" is not fully clear, RAN1 understands that it is referring to the number of processes similar to the number of SL processes associated with a SL HARQ entity for SL communications. There is no concept of parallel SL PRS transmission processes defined/used in RAN1 and such a concept is expected to be transparent to RAN1 specifications. Accordingly, the maximum total number of parallel SL PRS transmission in a shared/dedicated SL PRS resource pool can be up to RAN2.

Question 1b (RAN2):
On the maximum number of parallel SL-PRS transmission
What is the maximum number of parallel SL-PRS transmission supported on a SL-PRS shared resource pool and SL-PRS dedicated resource pool, respectively?

RAN1's response:
Following from the response to the first question, the maximum number of parallel SL PRS transmission in a shared/dedicated SL PRS resource pool respectively can be up to RAN2.

Question 2 (RAN2):
When SL-PRS is transmitted on a SL-PRS shared resource pool where PSFCH is configured, if the associated PSSCH transmission is positively acknowledged, should the UE continue to perform SL-PRS retransmission?

RAN1's response:
Since there is no notion of Layer 1 feedback in response to SL PRS transmission, a positive acknowledgement for an associated PSSCH may not be interpreted to indicate successful reception of SL PRS (see RAN1 conclusion from RAN1 #113 below). Accordingly, a Tx UE may continue to perform SL PRS retransmissions if it has been provided with multiple resources for (re-)transmission by the MAC layer, subject to any restrictions on the maximum number of retransmissions.

| Conclusion |
| --- |
| Do not support ACK/NACK feedback for SL-PRS or lower-layer feedback-based retransmissions in Release 18. |

\*\*\*\*\*\*\*\*\*\*\*\*\*\*\*\*\*\*\*\*\*\*\*\*\*\*\*\*\*\*\*\*\*QUOTATION [8] END\*\*\*\*\*\*\*\*\*\*\*\*\*\*\*\*\*\*\*\*\*\*\*\*\*\*\*\*\*\*\*\*\*

For New Radio (NR) Release-16/17 sidelink design, sidelink slots can be utilized for Physical Sidelink Control Channel (PSCCH)/Physical Sidelink Shared Channel (PSSCH)/Physical Sidelink Feedback Channel (PSFCH) transmission/reception. Moreover, a concept of sidelink resource pool for sidelink communication is utilized for PSCCH/PSSCH and/or/PSFCH transmission/reception. A sidelink (communication) resource pool will comprise a set of sidelink slots (except at least slots for Physical Sidelink Broadcast Channel (PSBCH)) and a set of frequency resources. Different sidelink (communication) resource pools may be Time Division Multiplexed (TDMed) and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in another/other sidelink (communication) resource pool. For a PSCCH/PSSCH, an associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (Res), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, a fixed relationship between the PSCCH and the PSSCH resource is specified, which means that the PSCCH will be located in the lowest (index of) sub-channel of the scheduled PSSCH resource. As for scheduled PSSCH resources in different slot(s), a starting frequency position of the scheduled PSSCH resource will be scheduled/indicated by sidelink control information, instead of a fixed relationship.

In current NR Release-16/17 sidelink design, one Sidelink Control Information (SCI) could indicate at most three PSSCH resources, for a same sidelink data packet, via Frequency resource assignment and/or Time resource assignment in the Sidelink Control Information (SCI). The SCI may comprise a 1st stage SCI and a 2nd stage SCI. The 1st stage SCI may be transmitted via PSCCH. The 2nd stage SCI may be transmitted via multiplexing with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources scheduled by the SCI are utilized/associated with a same sidelink data packet, e.g., a same Transport Block (TB) or a same Medium Access Control (MAC) Packet Data Unit (PDU). Note that a standalone PSCCH/SCI is not supported in NR sidelink, which means that for each PSSCH transmission in a slot, there will be a corresponding PSCCH/SCI transmission in the same slot, and vice versa.

Figure 5:
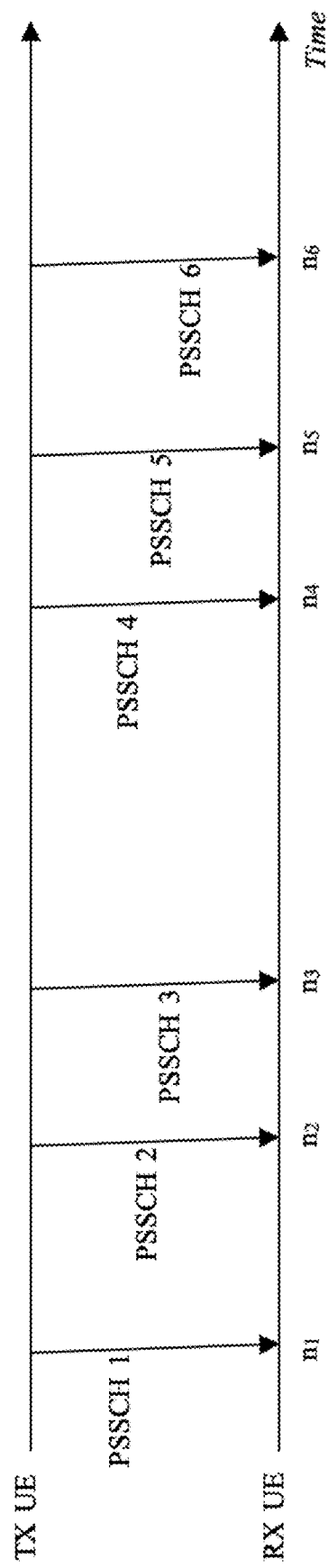
FIG. 5 is an example diagram of multiple PSSCH transmissions for a same sidelink data packet, wherein PSSCH 1 is an initial/new PSSCH transmission and PSSCH 26 are PSSCH retransmissions, in accordance with embodiments of the present invention.

Furthermore, a Transmission (TX) User Equipment (UE) may transmit the same sidelink data packet via multiple PSSCH transmissions, e.g., the PSSCH 1 (the initial/new PSSCH transmission) and PSSCH 2~6 (PSSCH retransmission) in FIG. 5. The TX UE may transmit SCI 1 in slot $n_1$ for indicating/scheduling PSSCH 1-3. The TX UE may transmit SCI 2 in slot $n_2$ for indicating/scheduling PSSCH 2-4. The TX UE may transmit SCI 3 in slot $n_3$ for indicating/scheduling PSSCH 3-5. The TX UE may transmit SCI 4 in slot $n_4$ for indicating/scheduling PSSCH 4~6. The TX UE may transmit SCI 5 in slot $n_5$ for indicating/scheduling PSSCH 5-6. The TX UE may transmit SCI 6 in slot $n_6$ for indicating/scheduling PSSCH 6. For the same sidelink data packet, the TX UE may indicate/set the SCI 1-6 with/as the same Hybrid Automatic Repeat request (HARQ) process number, the same New data indicator (NDI) value, the same (Layer-1) source Identification (ID), the same (Layer-1) destination ID, and the same cast type.

Moreover, resource reservation for another/different TB by an SCI could be (pre-)configured with enabled or not enabled or not configured in a sidelink (communication) resource pool. When a sidelink (communication) resource pool is configured with enabled such resource reservation, the sidelink (communication) resource pool is configured with a set of reservation period values. A possible reservation period could be 0, 1:99, 100, 200, 300, 400, 500, 600, 700, 800, 900, 1000 ms. The resource reservation period field in an SCI in the sidelink (communication) resource pool could indicate which reservation period value for (future) resource reservation. The size/number of the set of reservation period values could be from 1 to 16.

In current NR Release-16/17 sidelink design, there are two sidelink resource allocation modes defined for NR sidelink communication:

mode 1 is that a base station/network node can schedule sidelink resource(s) to be used by a UE for sidelink transmission(s); and mode 2 is that the UE determines (i.e., the base station/network node does not schedule) sidelink transmission resource(s) within sidelink resources configured by the base station/network node or pre-configured sidelink resources.

For the UE (autonomous) selection mode, e.g., NR sidelink resource allocation mode 2, since transmission resource is not scheduled via the network node, the UE may require performing sensing before selecting one or more resources for PSSCH transmission(s) (e.g., sensing-based transmission), in order to avoid resource collision and interference from or to another/other UEs (especially UEs using NR sidelink).

Full sensing is supported from NR Rel-16 sidelink, while partial sensing is supported from NR Rel-17 sidelink. Based on the result of a sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission. As specified in TS 38.321 section 5.22.1.1 (e.g., [5]3GPP TS 38.321 V18.0.0), the TX UE may be configured with maximum transmission number si-MaxTx-TransNumPSSCH, which may be derived based on priority and Channel Busy Ratio (CBR). The TX UE will select a number of HARQ retransmission from allowed numbers given the restriction of maximum transmission number si-MaxTxTransNumPSSCH. As shown in the instance of FIG. 5, the TX UE may (randomly) select 6 valid/identified resources to perform PSSCH 1-6 transmissions for transmitting the same sidelink data packet, wherein the maximum transmission number may be 8.

For network scheduling mode, e.g., NR sidelink resource allocation mode 1, dynamic grant, configured grant Type 1 and configured grant Type 2 are supported (e.g., [2]3GPP TS 38.214 V18.2.0). Regarding dynamic grant, the network node may transmit a Sidelink (SL) grant, e.g., Downlink Control Information (DCI) format 3_0 scrambled by SL-Radio Network Temporary Identifier (RNTI), on Uu interface for scheduling at most three PSSCH resources (for a same sidelink data packet) to a TX UE. The sidelink grant also comprises "resource pool index" for indicating one sidelink (communication) resource pool, wherein the scheduled at most three PSCCH/PSSCH resources are within the indicated one sidelink (communication) resource pool. The TX UE may perform PSCCH and PSSCH transmissions on PC5 interface, in response to the received sidelink grant, for a sidelink data packet.

The Uu interface means the wireless interface for communication between the network and the UE. The PC5 interface means the wireless interface for communication (directly) between UEs/devices.

Moreover, decoding of sidelink data packet in a Reception (RX) UE can support HARQ combining from received multiple PSSCH transmissions. The sidelink data packet can be SL HARQ feedback enabled or disabled. If the sidelink data packet is SL HARQ feedback enabled, the RX UE may transmit Negative Acknowledgment (NACK) on PSFCH to the TX UE if the RX UE does not yet decode the sidelink data packet successfully. The RX UE may transmit Acknowledgement (ACK) (including not transmitting feedback in NACK-only feedback mode) on PSFCH to the TX UE if the RX UE decodes the sidelink data packet successfully. When the TX UE receives/detects NACK, the TX UE may perform PSSCH retransmission for transmitting the same sidelink data packet, via the selected SL resources, if any, in NR sidelink resource allocation mode 2 or via scheduled/configured SL resources by an SL grant, if any, in NR sidelink resource allocation mode 1. Note that in NR sidelink resource allocation mode 2, if the TX UE utilizes all selected SL resources for performing PSSCH retransmissions for the sidelink data packet and if the TX UE still receives/detects NACK, the TX UE may not be able to perform another/other PSSCH retransmission for transmitting the same sidelink data packet. When the TX UE receives/detects ACK, the TX UE may stop performing PSSCH retransmission even if there are un-utilized selected or scheduled/configured SL resources for the sidelink data packet.

In NR Release 18, a new reference signal for SL positioning/ranging, noted as SL-PRS, is introduced.

SL-PRS measurements may be utilized for positioning/ranging solutions, such as SL Round Trip Time (RTT), SL-Angle of Arrival (AoA), SL-Time Difference Of Arrival (TDOA), SL-Angle of Departure (AoD). For supporting time-based positioning methods, larger bandwidth for SL-PRS may be required for higher accuracy positioning. It is quite possible that the required bandwidth for SL-PRS may be 10 MHz, 20 MHz, or even more, especially in a higher frequency band.

With regard to the SL-PRS resources/transmissions, there are two kinds of sidelink resource pools: dedicated SL-PRS resource pools and Shared SL-PRS resource pools (shared with a sidelink communication). They may be denoted as an SL-PRS dedicated resource pool and an SL-PRS shared resource pool.

In a dedicated SL-PRS resource pool, there are no PSSCH/PSFCH resources. The TX UE may transmit a PSCCH carrying SCI format 1-B for scheduling/allocating an SL-PRS resource/transmission within same slot.

In a shared SL-PRS resource pool, SL-PRS transmission (s) can be multiplexed with PSSCH resources in a TDM manner (symbol-level division in a slot). The TX UE may transmit a PSCCH carrying SCI format 1-A and also transmit a $2^{nd}$-stage SCI, e.g., SCI format 2-D, for scheduling/allocating both an SL-PRS resource/transmission and a PSSCH transmission within a same slot. When PSSCH and SL-PRS are multiplexed in the same slot, they will share the same source ID, destination ID, cast type fields.

For SL-PRS resource allocation, scheme/mode 1 and scheme/mode 2 are introduced.

Scheme/mode 1: Network-centric operation SL-PRS resource allocation (e.g., similar to a legacy NR Mode 1 for PSSCH).
  The network node (e.g., Nexte Generation Node B (gNB), Location management Function (LMF), gNB & LMF) allocates resources for SL-PRS.
Scheme/mode 2: TX UE autonomous SL-PRS resource allocation (e.g., similar to legacy NR Mode 2 for PSSCH).
  At least one of the UE(s) participating in the sidelink positioning operation allocates resources for SL-PRS.

According to RAN1 #113 (e.g., [6] RAN1 Chair's Notes of 3GPP TSG RAN WG1 #113), it does not support ACK/NACK feedback for SL-PRS or lower-layer feedback-based retransmissions in Release 18. It means that HARQ feedback and HARQ combining are not supported for SL-PRS. More specifically, the TX UE may perform one or multiple SL-PRS transmissions. The RX UE may receive the one or multiple SL-PRS transmissions without HARQ combining them (the RX UE may perform measurement separately on the one or multiple SL-PRS transmissions).

In RAN1 #116 (e.g., [7] RAN1 Chair's Notes of 3GPP TSG RAN WG1 #116, [8]R1-2401552), there is agreement on SL-PRS retransmissions. When SL-PRS is transmitted on an SL-PRS shared resource pool, and if the associated PSSCH transmission is positively acknowledged, the TX UE may continue to perform SL-PRS retransmissions if it has been provided with multiple resources for (re-)transmission by the MAC layer, subject to any restrictions on the maximum number of retransmissions. However, according to the current MAC specification (e.g., [5]3GPP TS 38.321 V18.0.0, [6] RAN1 Chair's Notes of 3GPP TSG RAN WG1 #113), for the SL-PRS shared resource pool in mode 2, the TX UE selects a number of HARQ retransmissions from allowed numbers given the restriction of a maximum transmission number sl-MaxTxTransNumPSSCH. It is not clear how to determine/derive how many resources will be selected for SL-PRS (re)transmissions. In comparison with SL-PRS dedicated resource pool in mode 2, the TX UE selects a number of SL-PRS retransmissions from allowed numbers given restriction of a configured maximum transmission number sl-PRS-MaxNum-Transmissions. Furthermore, when the associated PSSCH transmission is positively acknowledged, the TX UE will not perform PSSCH retransmissions even if there are un-utilized selected SL resources (in mode 2) or un-utilized scheduled/configured SL resources (in mode 1). It is not clear how the TX UE performs SL-PRS retransmission. On the other hand, if the RX UE performs SL Discontinuous Reception (DRX) operation after the RX UE transmits positively acknowledgement on the PSSCH (re-)transmission, the RX UE may not (continue to) monitor SCI for PSSCH retransmission. It is possible that the RX UE will miss the following SL-PRS retransmission from the TX UE.

To deal with the above and herein issues, various examples and embodiments of the present invention are described below. For the methods, alternatives, concepts, examples, and embodiments detailed above and herein, the following aspects and embodiments are possible.

Concept A

A TX UE may be configured with an SL-PRS shared resource pool. TX UE may determine to perform a first number of SL-PRS (re)transmissions, e.g., for a first pending SL-PRS, in the SL-PRS shared resource pool. Preferably in certain embodiments, the TX UE may determine/select a first number of SL resources, e.g., for the first pending SL-PRS, in the SL-PRS shared resource pool. The TX UE may perform the first number of SL-PRS (re)transmissions on the first number of SL resources. Preferably in certain embodiments, the first number may be denoted/replaced as a first value N.

Preferably in certain embodiments, in case 1, the first number of SL-PRS (re)transmissions may be/mean (or include) the first number of SL-PRS retransmissions. The first number of SL-PRS (re)transmissions may not comprise a new/initial SL-PRS transmission. The TX UE may select a first SL resource and perform a first new/initial SL-PRS transmission on the first SL resource, in additional to the first number of SL-PRS transmissions. For the first pending SL-PRS, the TX UE may perform (N+1) SL-PRS transmissions, including the first new/initial SL-PRS transmission and the first number of SL-PRS retransmissions. Preferably in certain embodiments, the first value N may be zero or more. Alternatively, the first value N may be one or more.

Alternatively, in case 2, the first number of SL-PRS (re)transmission may comprise a first new/initial SL-PRS transmission and (N−1) SL-PRS retransmissions. For the first pending SL-PRS, the TX UE may perform N SL-PRS transmissions, including the first new/initial SL-PRS transmission and the (N−1) SL-PRS retransmissions. Preferably in certain embodiments, the first value N may be one or more.

Preferably in certain embodiments, the TX UE may perform one SL-PRS (re)transmission, if any, and one PSSCH (re)transmission, if any, in one selected SL resource. Preferably in certain embodiments, the TX UE may perform at most one SL-PRS (re)transmission and at most one PSSCH (re)transmission in one selected SL resource.

In an embodiment A1, the TX UE may be configured with a first parameter of a maximum number of SL-PRS transmissions. Preferably in certain embodiments, the first parameter of the maximum number of SL-PRS transmission may be configured in a configuration of the SL-PRS shared resource pool. Preferably in certain embodiments, the first parameter of the maximum number of SL-PRS transmission may be configured in a configuration of an SL-PRS dedicated resource pool configured to/for the TX UE. Preferably in certain embodiments, the TX UE may select the first number of SL-PRS (re)transmissions given a restriction of the first parameter. The TX UE may select the first number of SL resources given the restriction of the first parameter. Preferably in certain embodiments, the TX UE may select the first number of SL-PRS (re)transmissions from a first set of allowed numbers, wherein the first set of allowed numbers are restricted/determined by the first parameter. The TX UE may select the first number of SL resources from the first set of allowed numbers, wherein the first set of allowed numbers re restricted/determined by the first parameter. For instance, if the first parameter is 8, the first set of allowed numbers may be/comprise $\{1, \ldots, 7\}$ for case 1 or $\{1, \ldots, 8\}$ for case 2. For instance, if the first parameter is 8, the first value/number may be any of 1 to 7 for case 1 or any of 1 to 8 for case 2.

Preferably in certain embodiments, the TX UE may be configured with a second parameter of a maximum number of PSSCH transmissions. The second parameter of the maximum number of PSSCH transmission may be configured in a configuration of the SL-PRS shared resource pool. Preferably in certain embodiments, the TX UE may select a second number of PSSCH (re)transmissions given a restriction of the second parameter in the SL-PRS shared resource pool. Preferably in certain embodiments, the TX UE may select the second number of PSSCH (re)transmissions from the second set of allowed numbers, wherein the second set of allowed numbers is restricted/determined by the second parameter, in the SL-PRS shared resource pool. Preferably in certain embodiments, the second number of PSSCH (re)transmissions are for transmitting the same sidelink data packet. Preferably in certain embodiments, the second number may be denoted/replaced as a second value M.

Preferably in certain embodiments, the first parameter and the second parameter may be the same or different. Preferably in certain embodiments, the first parameter and the second parameter may be provided/configured separately/independently.

Preferably in certain embodiments, if the first number/value is larger than the second number/value, the TX UE may select the first number of SL resources. The TX UE may perform one or more SL-PRS (re)transmissions and one or more PSSCH (re)transmissions on the first number of SL resources. Preferably in certain embodiments, the TX UE may perform the first number of SL-PRS (re)transmissions on the first number of SL resources, and the TX UE may perform at most the second number of PSSCH (re)transmissions for transmitting the same sidelink data packet on part of the first number of SL resources, i.e., M SL resources of the selected N SL resources.

Preferably in certain embodiments, if the second number/value is larger than the first number/value, the TX UE may select the second number of SL resources (instead of selecting the first number of SL resources). The TX UE may perform one or more SL-PRS (re)transmissions and one or more PSSCH (re)transmissions on the second number of SL resources. Preferably in certain embodiments, the TX UE may perform at most the second number of PSSCH (re)transmissions for transmitting the same sidelink data packet on the second number of SL resources, and the TX UE may perform at most the first number of SL-PRS (re)transmissions on part of the second number of SL resources, i.e., N SL resources of the selected M SL resources.

Alternatively and/or preferably in certain embodiments, if the first number/value is smaller than the second number/value, the TX UE may select the first number of SL resources. The TX UE may perform one or more SL-PRS (re)transmissions and one or more PSSCH (re)transmissions on the first number of SL resources. Preferably in certain embodiments, the TX UE may perform the first number of SL-PRS (re)transmissions on the first number of SL resources, and the TX UE may perform at most the first number of PSSCH (re)transmissions for transmitting the same sidelink data packet on the first number of SL resources.

Alternatively and/or preferably in certain embodiments, if the second number/value is smaller than the first number/value, the TX UE may select the second number of SL resources (instead of selecting the first number of SL resources). The TX UE may perform one or more SL-PRS (re)transmissions and one or more PSSCH (re)transmissions on the second number of SL resources. Preferably in certain embodiments, the TX UE may perform at most the second number of PSSCH (re)transmissions for transmitting the same sidelink data packet on the second number of SL resources, and the TX UE may perform the first number of SL-PRS (re)transmissions on the second number of SL resources.

Alternatively and/or preferably in certain embodiments, the TX UE may select the first number of SL resources given restriction of the first parameter of a maximum number of SL-PRS transmissions and the second parameter of a maximum number of PSSCH transmissions. Preferably in certain embodiments, the TX UE may select the first number of SL-PRS (re)transmissions and PSSCH (re)transmissions given a restriction of the first parameter of the maximum number of SL-PRS transmissions and the second parameter of the maximum number of PSSCH transmissions. Preferably in certain embodiments, TX UE may perform the first number of SL-PRS (re)transmissions on the first number of SL resources, and the TX UE may perform at most the first number of PSSCH (re)transmissions for transmitting the same sidelink data packet on the first number of SL resources.

In an embodiment A2, the TX UE may be configured with a second parameter of a maximum number of PSSCH transmissions. The second parameter of the maximum number of PSSCH transmission may be configured in a configuration of the SL-PRS shared resource pool. Preferably in certain embodiments, the TX UE may select a second number of PSSCH (re)transmissions given restriction of the second parameter in the SL-PRS shared resource pool. Preferably in certain embodiments, the TX UE may select the second number of PSSCH (re)transmissions from the second set of allowed numbers, wherein the second set of allowed numbers are restricted/determined by the second parameter, in the SL-PRS shared resource pool. Preferably in certain embodiments, the second number of PSSCH (re)transmissions are for transmitting the same sidelink data packet. Preferably in certain embodiments, the second number may be denoted/replaced as a second value M.

Preferably in certain embodiments, the TX UE may select the first number of SL-PRS (re)transmissions given a restriction of the second parameter of a maximum number of PSSCH transmissions. The TX UE may select the first number of SL resources given the restriction of the second parameter. Preferably in certain embodiments, the TX UE may select the first number of SL-PRS (re)transmissions from a first set of allowed numbers, wherein the first set of allowed numbers is restricted/determined by the second parameter. The TX UE may select the first number of SL resources from the first set of allowed numbers, wherein the first set of allowed numbers is restricted/determined by the second parameter. For instance, if the second parameter is 8, the first set of allowed numbers may be/comprise $\{1, \ldots, 7\}$ for case 1 or $\{1, \ldots, 8\}$ for case 2. For instance, if the second parameter is 8, the first value/number may be any of 1 to 7 for case 1 or any of 1 to 8 for case 2.

Preferably in certain embodiments, given the same second parameter, the TX UE may select the first number of SL-PRS (re)transmissions and select the second number of PSSCH (re)transmissions.

Preferably in certain embodiments, if the first number/value is larger than the second number/value, the TX UE may select the first number of SL resources. The TX UE may perform one or more SL-PRS (re)transmissions and one or more PSSCH (re)transmissions on the first number of SL resources. Preferably in certain embodiments, the TX UE may perform the first number of SL-PRS (re)transmissions on the first number of SL resources, and the TX UE may perform at most the second number of PSSCH (re)transmissions for transmitting the same sidelink data packet on part of the first number of SL resources, i.e., M SL resources of the selected N SL resources.

Preferably in certain embodiments, if the second number/value is larger than the first number/value, the TX UE may select the second number of SL resources (instead of selecting the first number of SL resources). The TX UE may perform one or more SL-PRS (re)transmissions and one or more PSSCH (re)transmissions on the second number of SL resources. Preferably in certain embodiments, the TX UE may perform at most the second number of PSSCH (re)transmissions for transmitting the same sidelink data packet on the second number of SL resources, and the TX UE may perform at most the first number of SL-PRS (re)transmissions on part of the second number of SL resources, i.e., N SL resources of the selected M SL resources.

Alternatively and/or preferably in certain embodiments, if the first number/value is smaller than the second number/value, the TX UE may select the first number of SL resources. The TX UE may perform one or more SL-PRS (re)transmissions and one or more PSSCH (re)transmissions on the first number of SL resources. Preferably in certain embodiments, the TX UE may perform the first number of SL-PRS (re)transmissions on the first number of SL resources, and the TX UE may perform at most the first number of PSSCH (re)transmissions for transmitting the same sidelink data packet on the first number of SL resources.

Alternatively and/or preferably in certain embodiments, if the second number/value is smaller than the first number/value, the TX UE may select the second number of SL resources (instead of selecting the first number of SL resources). The TX UE may perform one or more SL-PRS (re)transmissions and one or more PSSCH (re)transmissions on the second number of SL resources. Preferably in certain embodiments, the TX UE may perform at most the second number of PSSCH (re)transmissions for transmitting the same sidelink data packet on the second number of SL resources, and the TX UE may perform the first number of SL-PRS (re)transmissions on the second number of SL resources.

In an embodiment A3, the TX UE may be configured with a second parameter of a maximum number of PSSCH transmissions. The second parameter of the maximum number of PSSCH transmission may be configured in a configuration of the SL-PRS shared resource pool. Preferably in certain embodiments, the TX UE may select the first number of SL-PRS (re)transmissions and/or PSSCH (re)transmissions, given a restriction of the second parameter of maximum number of PSSCH transmissions. The TX UE may select the first number of SL resources given the restriction of the second parameter. The first number of SL resources are utilized for the first number of SL-PRS (re)transmissions and/or PSSCH (re)transmissions. Preferably in certain embodiments, the TX UE may select the first number of SL-PRS (re)transmissions and/or PSSCH (re)transmissions from a first set of allowed numbers, wherein the first set of allowed numbers are restricted/determined by the second parameter. The TX UE may select the first number of SL resources from the first set of allowed numbers, wherein the first set of allowed numbers are restricted/determined by the second parameter. The first number of SL resources are utilized for the first number of SL-PRS (re)transmissions and/or PSSCH (re)transmissions. For instance, if the second parameter is 8, the first set of allowed numbers may be/comprise $\{1, \ldots, 7\}$ for case 1 or $\{1, \ldots, 8\}$ for case 2. For instance, if the second parameter is 8, the first value/number may be any of 1 to 7 for case 1 or any of 1 to 8 for case 2. More specifically, in sidelink resource selection in mode 2, a number of selected SL resources for SL-PRS (re)transmissions are restricted/determined as the same as a number of selected SL resources for PSSCH (re)transmissions.

Preferably in certain embodiments, based on embodiment A1, A2, or A3, a text proposal 1 (bold, underline, and strikethrough) may be provided as below.

===================Text Proposal
1===================
1> if the MAC entity has selected to create a selected sidelink grant corresponding to transmissions of multiple MAC PDUs, and SL data is available in a logical channel; or
1> if the MAC entity has selected to create a selected sidelink grant corresponding to transmission(s) of multiple SL-PRS(s), which have been triggered by the upper layer or by the reception of a SCI from a peer UE:
. . .
    3> if the selected resource pool is not SL-PRS dedicated resource pool:
        4> select one of the allowed values configured by RRC in sl-ResourceReservePeriodList and set the resource reservation interval, $P_{rsvp\_TX}$, with the selected value;
        4> select the number of HARQ retransmissions and SL-PRS transmissions, if available, from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) and pending SL-PRS transmission(s), if available, allowed on the carrier and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;
        4> select the number of HARQ retransmissions and the number of SL-PRS transmissions, if available, from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) and pending SL-PRS transmission(s), if available, allowed on the carrier and the CBR measured by lower layers according to clause 5.1.27 of TS 38.215 [24] . . .
1> if the MAC entity has selected to create a selected sidelink grant corresponding to transmission(s) of a single MAC PDU, and if SL data is available in a logical channel, or an SL-CSI reporting is triggered, or a Sidelink DRX Command indication is triggered or a Sidelink Inter-UE Coordination Information reporting is triggered, or a Sidelink Inter-UE Coordination Request is triggered; or
1> if the MAC entity has selected to create a selected sidelink grant corresponding to transmission of a single SL-PRS, which has been triggered by the upper layer or by the reception of a SCI from a peer UE:
. . .
    3> if the selected resource pool is not SL-PRS dedicated resource pool:
        4> select the number of HARQ retransmissions and SL-PRS transmissions, if available, from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) and pending SL-PRS transmission(s), if available allowed on the carrier and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;
        4> select the number of HARQ retransmissions and the number of SL-PRS transmissions, if available, from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) and pending SL-PRS . . . .
=======================End of Text Proposal
1=======================

Concept B

A TX UE may be configured with an SL-PRS shared resource pool. The TX UE may determine a first number of SL-PRS (re)transmissions, e.g., for a first pending SL-PRS, in the SL-PRS shared resource pool. Preferably in certain embodiments, the first number may be denoted/replaced as a first value N. The TX UE may determine a second number of PSSCH (re)transmissions, e.g., for a first sidelink data packet, in the SL-PRS shared resource pool. Preferably in certain embodiments, the second number may be denoted/replaced as a second value M.

Preferably in certain embodiments, the TX UE may multiplex one or more SL-PRS (re)transmissions and one or more PSSCH (re)transmissions in the SL-PRS shared resource pool. Preferably in certain embodiments, the TX UE may multiplex the one or more SL-PRS (re)transmissions for the first pending SL-PRS and the one or more PSSCH (re)transmissions for the first sidelink data packet in the SL-PRS shared resource pool. Preferably in certain embodiments, the one or more SL-PRS (re)transmissions are among the first number of SL-PRS (re)transmissions. Preferably in certain embodiments, the one or more SL-PRS (re)transmissions are for the first pending SL-PRS. Preferably in certain embodiments, the one or more PSSCH (re)transmissions are for the first sidelink data packet. Preferably in certain embodiments, the one or more SL-PRS (re)transmissions are among the second number of PSSCH (re)transmissions.

Preferably in certain embodiments, the TX UE may perform one SL-PRS (re)transmission, if any, and one PSSCH (re)transmission, if any, in one SL resource. Preferably in certain embodiments, the TX UE may perform at most one SL-PRS (re)transmission and at most one PSSCH (re)transmission in one SL resource. Preferably in certain embodiments, the one SL resource is/means (or includes) one PSSCH resource in the SL-PRS shared resource pool.

Concept B is to handle the case where the TX UE receives/detects positive acknowledgement for the first sidelink data packet or for a first PSSCH (re)transmission among the one or more PSSCH (re)transmissions. The first PSSCH (re)transmission may be among the second number of PSSCH (re)transmissions. Preferably in certain embodiments, the TX UE may already perform m PSSCH (re) transmission before the TX UE receives/detects the positive acknowledgement. Preferable, the first PSSCH (re)transmission may be the m-th PSSCH (re)transmission among the second number PSSCH (re)transmissions. Preferable, m may be smaller than or equal to the second value M. When the TX UE receives/detects the positive acknowledgement, there may be a (M-m) pending or not yet transmitted PSSCH (re)transmission.

In one embodiment B1, the first number/value may be (restricted as) the same as the second number/value. The TX UE may determine the first number of SL-PRS (re)transmissions (for the first pending SL-PRS) and PSSCH (re) transmissions for the first sidelink data packet.

In case that the TX UE is in sidelink resource allocation mode 2 or the TX UE performs resource selection, the TX UE may select/determine the first number of SL resources in the SL-PRS shared resource pool.

Preferably in certain embodiments, the TX UE may already perform a m PSSCH (re)transmission in m SL resources, among the selected/determined first number of SL resources, before the TX UE receives/detects the positive acknowledgement. The TX UE may already perform the m PSSCH (re)transmission with a multiplexing SL-PRS transmission, before the TX UE receives/detects the positive acknowledgement. There may be (M-m) remaining/pending/ reserved SL resources. The reserved SL resource may mean selected and not yet transmitted/utilized SL resource. The (M-m) can be changed to (N-m).

Preferably in certain embodiments, the TX UE may stop/cancel utilizing the remaining/pending/reserved SL resources for performing SL-PRS (re)transmissions (e.g., for the first pending SL-PRS). Preferably in certain embodiments, the TX UE may stop/cancel utilizing the remaining/ pending/reserved SL resources for performing any SL transmissions. Preferably in certain embodiments, the TX UE may drop/discard/cancel the remaining/pending/reserved SL resources.

Alternatively and/or preferably in certain embodiments, (for satisfying the transmission number of the first pending SL-PRS) the TX UE may (continue to) perform one or multiple SL-PRS (re)transmissions (e.g., for the first pending SL-PRS) in (part or all of) the remaining/pending/ reserved SL resources. Preferably in certain embodiments, in one SL resource of the remaining/pending/reserved SL resources, the TX UE may (continue to) perform one SL-PRS (re)transmission. Preferably in certain embodiments, the RX UE may receive/detect/measure the one or multiple SL-PRS transmissions.

Moreover, the TX UE may perform the one or multiple SL-PRS (re)transmissions with multiplexing one or multiple PSSCH (re)transmissions in (part or all of) the remaining/ pending/reserved SL resources. Preferably in certain embodiments, in one SL resource of the remaining/pending/ reserved SL resources, the TX UE may (continue to) perform one SL-PRS (re)transmission and one of the one or multiple PSSCH (re)transmissions.

Preferably in certain embodiments, the one or multiple PSSCH (re)transmissions may comprise/include the first sidelink data packet. Preferably in certain embodiments, the TX UE may perform the one or multiple SL-PRS (re) transmissions with multiplexing the one or multiple PSSCH (re)transmissions for the first sidelink data packet in (M-m) the remaining/pending/reserved SL resources. Preferably in certain embodiments, the RX UE may not decode the first sidelink data packet in the one or multiple PSSCH (re) transmissions.

Alternatively and/or preferably in certain embodiments, the one or multiple PSSCH (re)transmissions may comprise/ include a second sidelink data packet. Preferably in certain embodiments, the TX UE may perform the one or multiple SL-PRS (re)transmissions with multiplexing the one or multiple PSSCH (re)transmissions for the second sidelink data packet in (M-m) the remaining/pending/reserved SL resources. Preferably in certain embodiments, the second sidelink data packet may comprise/include (only) a dummy/ pending data. Preferably in certain embodiments, the second sidelink data packet may not comprise/include sidelink data from any sidelink logical channel. Preferably in certain embodiments, the second sidelink data packet may or may not comprise/include (SL) MAC Control Element (CE). Preferably in certain embodiments, the second sidelink data packet and the first sidelink data packet are associated with the same (layer-2 or layer-1) destination ID and/or (layer-2 or layer-1) source ID. Preferably in certain embodiments, the RX UE may not decode the second sidelink data packet in the one or multiple PSSCH (re)transmissions.

Alternatively and/or preferably in certain embodiments, the one or multiple PSSCH (re)transmissions may comprise/ include a third sidelink data packet. Preferably in certain embodiments, the TX UE may perform the one or multiple SL-PRS (re)transmissions with multiplexing the one or multiple PSSCH (re)transmissions for the third sidelink data packet in (M-m) the remaining/pending/reserved SL resources. Preferably in certain embodiments, the third sidelink data packet may comprise/include sidelink data from one or more sidelink logical channels. Preferably in certain embodiments, the third sidelink data packet may or may not comprise/include (SL) MAC CE. Preferably in certain embodiments, the third sidelink data packet and the first sidelink data packet are associated with the same (layer-2 or layer-1) destination ID and/or (layer-2 or layer-1) source ID. Preferably in certain embodiments, the RX UE may decode the third sidelink data packet in the one or multiple PSSCH (re)transmissions.

For any embodiments above, Preferably in certain embodiments, when the TX UE performs a first SL-PRS (re)transmission with multiplexing a first PSSCH (re)transmission for the first sidelink data packet (in a first slot), the TX UE may transmit first sidelink control information (in the first slot) for scheduling the first SL-PRS (re)transmission and the first PSSCH (re)transmission. The first sidelink control information may indicate a first HARQ process number, a first value of NDI, a first cast type, a first (layer-1) destination ID, and a first (layer-1) source ID. Preferably in certain embodiments, the first SL-PRS (re)transmission with multiplexing the first PSSCH (re)transmission may be performed before the TX UE receives/detects the positive acknowledgement.

Preferably in certain embodiments, when the TX UE performs another first SL-PRS (re)transmission with multiplexing another first PSSCH (re)transmission for the first sidelink data packet (in another first slot), the TX UE may transmit another first sidelink control information (in the another first slot) for scheduling the another first SL-PRS (re)transmission and the another first PSSCH (re)transmission. The another first sidelink control information may indicate the same first HARQ process number, the same first value of NDI, the same first cast type, the same first (layer-1) destination ID, and the same first (layer-1) source ID. Preferably in certain embodiments, the another first SL-PRS (re)transmission with multiplexing the another first PSSCH (re)transmission may be performed after the TX UE receives/detects the positive acknowledgement.

Preferably in certain embodiments, when the TX UE performs a second SL-PRS (re)transmission with multiplexing a second PSSCH (re)transmission for the second sidelink data packet (in a second slot), the TX UE may transmit second sidelink control information (in the second slot) for scheduling the second SL-PRS (re)transmission and the second PSSCH (re)transmission. The second sidelink control information may indicate a second HARQ process number, a second value of NDI, a second cast type, a second (layer-1) destination ID, and a second (layer-1) source ID. Preferably in certain embodiments, the second SL-PRS (re)transmission with multiplexing the second PSSCH (re)transmission may be performed after the TX UE receives/detects the positive acknowledgement. Preferably in certain embodiments, the second HARQ process number may be (restricted as) the same as the first HARQ process number. Alternatively, the second HARQ process number may be different from the first HARQ process number. Preferably in certain embodiments, the second value of NDI may be (restricted as) the same as the first value of NDI e.g., non-toggled NDI.

Alternatively, the second value of NDI may be (restricted to be) different from the first value of NDI, e.g., toggled NDI. Preferably in certain embodiments, the second cast type may be (restricted as) the same as the first cast type. Preferably in certain embodiments, the second (layer-1) destination ID may be (restricted as) the same as the first (layer-1) destination ID. Preferably in certain embodiments, the second (layer-1) source ID may be (restricted as) the same as the first (layer-1) source ID.

Preferably in certain embodiments, when the TX UE performs a third SL-PRS (re)transmission with multiplexing a third PSSCH (re)transmission for the third sidelink data packet (in a third slot), the TX UE may transmit third sidelink control information (in the third slot) for scheduling the third SL-PRS (re)transmission and the third PSSCH (re)transmission. The third sidelink control information may indicate a third HARQ process number, a third value of NDI, a third cast type, a third (layer-1) destination ID, and a third (layer-1) source ID. Preferably in certain embodiments, the third SL-PRS (re)transmission with multiplexing the third PSSCH (re)transmission may be performed after the TX UE receives/detects the positive acknowledgement.

Preferably in certain embodiments, the third HARQ process number may be (restricted as) the same as the first HARQ process number. Alternatively, the third HARQ process number may be different from the first HARQ process number. Preferably in certain embodiments, the third value of NDI may be (restricted to be) different from the first value of NDI, e.g., toggled NDI. Preferably in certain embodiments, the third cast type may be (restricted as) the same as the first cast type. Alternatively, the third cast type may be different from the first cast type. Preferably in certain embodiments, the third (layer-1) destination ID may be (restricted as) the same as the first (layer-1) destination ID. Alternatively, the third (layer-1) destination ID may be different from the first (layer-1) destination ID. Preferably in certain embodiments, the third (layer-1) source ID may be (restricted as) the same as the first (layer-1) source ID. Alternatively, the third (layer-1) source ID may be different from the first (layer-1) source ID.

Various examples and embodiments of the present invention are described below. For the methods, alternatives, concepts, examples, and embodiments detailed above and herein, the following aspects and embodiments are possible.

Note that any of the above and herein methods, alternatives, concepts, examples, and embodiments may be combined, in whole or in part, or applied simultaneously or separately.

For instance, the embodiment B1 may be preferably combined or applied with the embodiment A3.

For instance, the embodiment B1 may be preferably combined or applied with the embodiment A1 or A2.

Preferably in certain embodiments, the SL-PRS may be a sidelink positioning reference signal (SL-PRS).

Preferably in certain embodiments, the SL-PRS is not SL Channel State Information based Reference Signal (CSI-RS).

Preferably in certain embodiments, the SL-PRS may be represented/replaced as a sidelink reference signal.

Preferably in certain embodiments, the sidelink reference signal may be applied/utilized for (absolute and/or relative) positioning and/or ranging.

Preferably in certain embodiments, the sidelink reference signal may be applied/utilized for any of time-based positioning/ranging methods and/or angle-based positioning/ranging methods. Preferably in certain embodiments, the sidelink reference signal may be applied/utilized for any of TDoA, RTT-based positioning/ranging, AoA, AoD, or carrier phase measurement based positioning Preferably in certain embodiments, the sidelink reference signal may be an SL beam management Reference Signal (RS). Preferably in certain embodiments, the sidelink reference signal may be SL CSI-RS (for beam management), which is not combined within a PSSCH (bandwidth) in frequency domain. Preferably in certain embodiments, the sidelink reference signal may require large bandwidth. Preferably in certain embodiments, the sidelink reference signal may be utilized for (High-Resolution) localization, sensing, or imaging. Preferably in certain embodiments, the sidelink reference signal may be utilized for beam management (e.g., in Frequency Range 2 (FR2)).

Preferably in certain embodiments, any of above concepts, methods, aspects, alternatives, and embodiments for SL-PRS may be applied for another/other reference signal (e.g., reference signal designed/introduced in future 5G or 6G or etc).

Preferably in certain embodiments, any of above concepts, methods, aspects, alternatives, and embodiments for SL-PRS may be applied for SL CSI-RS (for beam management).

Preferably in certain embodiments, any of above concepts, methods, aspects, alternatives, and embodiments for SL-PRS may be applied for the reference signal for (High-Resolution) localization (e.g., reference signal designed/introduced in future 5G or 6G or etc).

Preferably in certain embodiments, any of above concepts, methods, aspects, alternatives, and embodiments for SL-PRS may be applied for the reference signal for (High-Resolution) sensing (e.g., reference signal designed/introduced in future 5G or 6G or etc).

Preferably in certain embodiments, the any of above concepts, methods, aspects, alternatives, and embodiments for SL-PRS may be applied for reference signal for (High-resolution) imaging (e.g., reference signal designed/introduced in future 5G or 6G or etc).

Preferably in certain embodiments, the shared SL-PRS resource pool is utilized/configured for PSSCH transmission/reception and/or SL-PRS transmission/reception. Preferably in certain embodiments, the shared SL-PRS resource pool may be a sidelink resource pool for PSSCH transmission/reception and enabled/configured/supported for SL-PRS transmission/reception/measurement.

Preferably in certain embodiments, the sidelink communication resource pool may be a sidelink resource pool for PSSCH transmission/reception and not enabled/configured/supported for SL-PRS transmission/reception/measurement.

Preferably in certain embodiments, the dedicated SL-PRS resource pool may be a sidelink resource pool comprising/providing at least SL-PRS resources and/or sidelink control resources. Preferably in certain embodiments, the dedicated SL-PRS resource pool does not comprise sidelink data resources (i.e., does not comprise PSSCH resources). Preferably in certain embodiments, the dedicated SL-PRS resource pool for SL-PRS does not comprise sidelink feedback resources.

Preferably in certain embodiments, the sidelink data packet may comprise or mean a (sidelink) TB or a (sidelink) MAC PDU. The (sidelink) MAC PDU may comprise a MAC subheader, MAC CE(s) if available, and/or sidelink data from sidelink logical channel(s) if available.

Preferably in certain embodiments, PSSCH may mean sidelink data transmission.

Preferably in certain embodiments, PSFCH may mean sidelink feedback transmission.

Preferably in certain embodiments, PSCCH may mean sidelink control transmission.

Preferably in certain embodiments, the SCI/PSCCH associated with SL-PRS may include/comprise information for scheduling/indicating/allocating SL-PRS resources.

Preferably in certain embodiments, sidelink control information in a shared SL-PRS resource pool or sidelink communication resource pool may be transmitted/delivered via 1st stage SCI and 2nd stage SCI.

Preferably in certain embodiments, the sidelink control information in shared SL-PRS resource pool or sidelink communication resource pool may be delivered at least in PSCCH. Preferably in certain embodiments, the sidelink control information in the shared SL-PRS resource pool or sidelink communication resource pool may comprise 1st stage SCI. Preferably in certain embodiments, the 1st stage SCI may be transmitted via PSCCH. Preferably in certain embodiments, the sidelink control information in the shared SL-PRS resource pool or sidelink communication resource pool may comprise 2nd stage SCI. Preferably in certain embodiments, the 2nd stage SCI may be transmitted via multiplexed with PSSCH. Preferably in certain embodiments, the SCI format 1 or SCI format 1-X is 1st stage SCI. Preferably in certain embodiments, the SCI format 2-A or 2-B or 2-C or 2-D or 2-X is a 2nd stage SCI.

Preferably in certain embodiments, the SCI format 2-A, 2-B, 2-C does not comprise SL-PRS resource-related information/fields.

Preferably in certain embodiments, the SCI format 2-D comprises SL-PRS resource-related information/fields.

Preferably in certain embodiments, for transmitting PSSCH in a slot or subslot, the TX UE needs to transmit SCI in the slot or the subslot for scheduling the PSSCH.

Preferably in certain embodiments, for transmitting SL-PRS in a slot or subslot, the TX UE needs to transmit SCI in the slot or the subslot for scheduling the SL-PRS.

Preferably in certain embodiments, the slot may mean a sidelink slot. Preferably in certain embodiments, the slot may be represented/replaced as a Transmission Time Interval (TTI).

Preferably in certain embodiments, the sidelink slot may mean a slot for sidelink. Preferably in certain embodiments, a TTI may be a subframe (for sidelink) or a slot (for sidelink) or sub-slot (for sidelink).

Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot, or a slot for sidelink may contain all Orthogonal frequency-division multiplexing (OFDM) symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with another/other (sidelink) resource pool.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel. Preferably in certain embodiments, the number of PRBs for each sub-channel may be any of 10, 12, 15, 20, 25, 50, 75, 100.

Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the first UE may have/maintain/establish multiple sidelink links/connections on PC5 interface. For different sidelink links/connections, the first UE may perform sidelink transmission/reception to/from different paired UE(s).

Preferably in certain embodiments, the first UE may have/maintain/establish a first sidelink link/connection and a second sidelink link/connection. The paired UE of the first sidelink link/connection may be different from the paired UE of the second sidelink link/connection. Preferably in certain embodiments, the sidelink logical channel(s) associated with (the paired UE of) the first sidelink link/connection are separate/independent from the sidelink logical channel(s) associated with (the paired UE of) the second sidelink link/connection.

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Anything (P2X) transmission/reception. Preferably in certain embodiments, the sidelink transmission/reception may be on PC5 interface.

Preferably in certain embodiments, the PC5 interface may be a wireless interface for communication between a device and a device. Preferably in certain embodiments, the PC5 interface may be a wireless interface for communication between devices. Preferably in certain embodiments, the PC5 interface may be a wireless interface for communication between UEs. Preferably in certain embodiments, the PC5 interface may be a wireless interface for V2X or P2X communication. Preferably in certain embodiments, the Uu interface may be a wireless interface for communication between a network node and a device. Preferably in certain embodiments, the Uu interface may be a wireless interface for communication between a network node and a UE.

Preferably in certain embodiments, the first UE may be a first device. Preferably in certain embodiments, the first UE may be a vehicle UE. Preferably in certain embodiments, the first UE may be a V2X UE.

Preferably in certain embodiments, the second UE may be a second device. Preferably in certain embodiments, the second UE may be a vehicle UE. Preferably in certain embodiments, the second device may be a V2X UE.

Preferably in certain embodiments, the first UE and the second device are different devices.

Various examples and embodiments of the present invention are described below. For the methods, alternatives, concepts, examples, and embodiments detailed above and herein, the following aspects and embodiments are possible.

Figure 6:
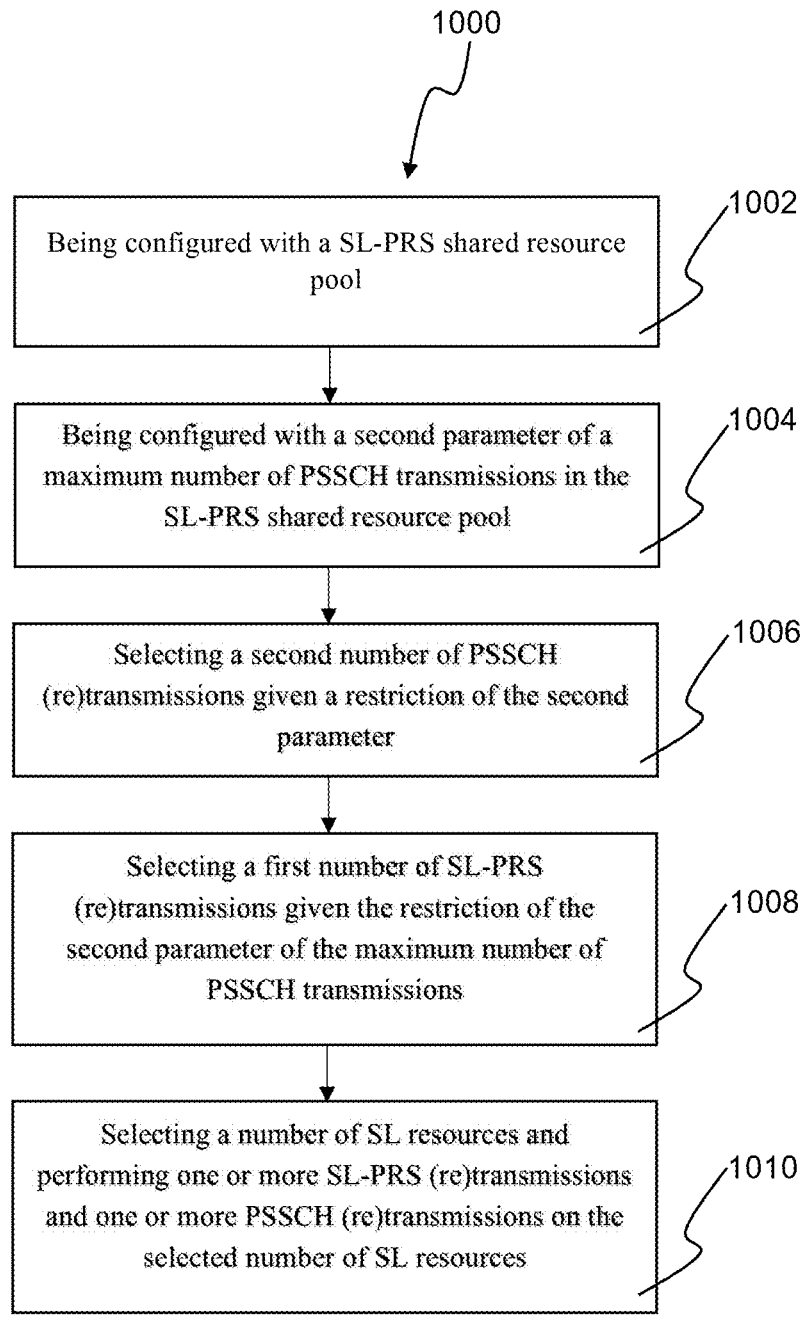
FIG. 6 is a flow diagram of a method of a first UE in a wireless communication system comprising being configured with an SL-PRS shared resource pool, being configured with a second parameter of a maximum number of PSSCH transmissions in the SL-PRS shared resource pool, selecting a second number of PSSCH (re)transmissions given a restriction of the second parameter, selecting a first number of SL-PRS (re)transmissions given the restriction of the second parameter of the maximum number of PSSCH transmissions, and selecting a number of SL resources and performing one or more SL-PRS (re)transmissions and one or more PSSCH (re)transmissions on the selected number of SL resources, in accordance with embodiments of the present invention.

Referring to FIG. 6, with this and other concepts, systems, and methods of the present invention, a method 1000 for a first device in a wireless communication system comprises being configured with an SL-PRS shared resource pool (step 1002), being configured with a second parameter of a maximum number of PSSCH transmissions in the SL-PRS shared resource pool (step 1004), selecting a second number of PSSCH (re)transmissions given a restriction of the second parameter (step 1006), selecting a first number of SL-PRS (re)transmissions given the restriction of the second parameter of the maximum number of PSSCH transmissions (step 1008), and selecting a number of SL resources and performing one or more SL-PRS (re)transmissions and one or more PSSCH (re)transmissions on the selected number of SL resources (step 1010).

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) be configured with an SL-PRS shared resource pool; (ii) be configured with a second parameter of a maximum number of PSSCH transmissions in the SL-PRS shared resource pool; (iii) select a second number of PSSCH (re)transmissions given a restriction of the second parameter; (iv) select a first number of SL-PRS (re)transmissions given the restriction of the second parameter of the maximum number of PSSCH transmissions; and (v) select a number of SL resources and perform one or more SL-PRS (re)transmissions and one or more PSSCH (re)transmissions on the selected number of SL resources. Moreover, the CPU 308 can execute the program code 312 to perform all of the described actions, steps, and methods described above, below, or otherwise herein.

Figure 7:
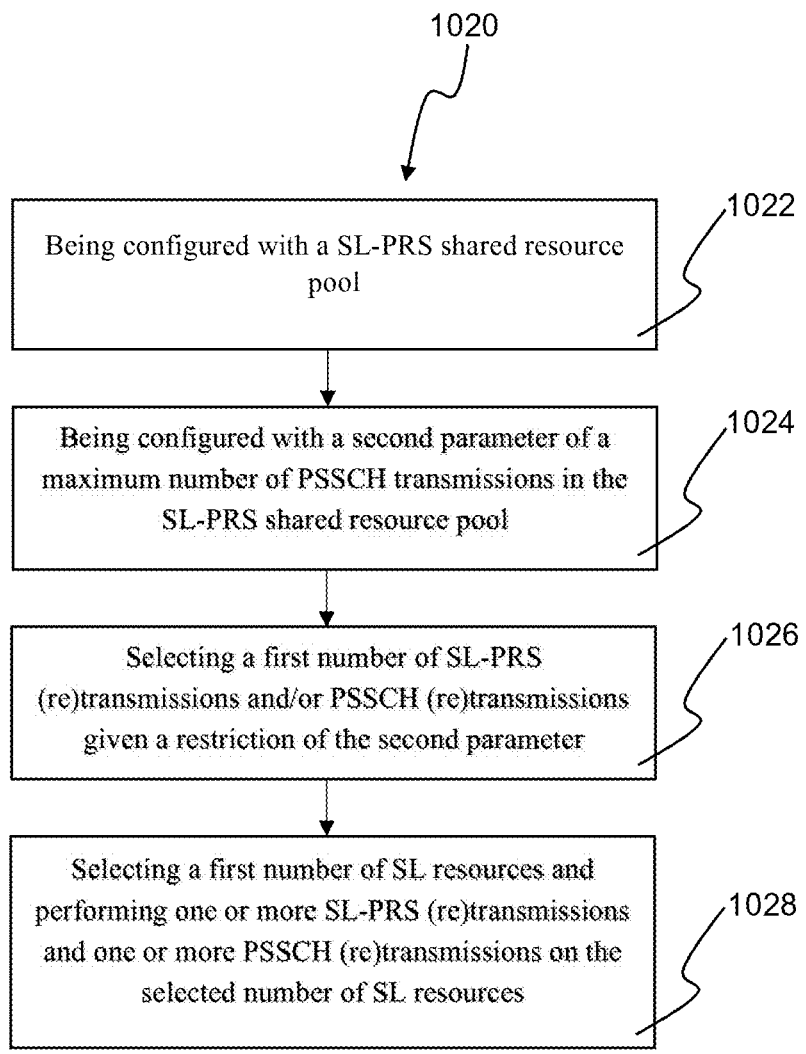
FIG. 7 is a flow diagram of a method of a first UE in a wireless communication system comprising being configured with an SL-PRS shared resource pool, being configured with a second parameter of a maximum number of PSSCH transmissions in the SL-PRS shared resource pool, selecting a first number of SL-PRS (re)transmissions and/or PSSCH (re)transmissions given a restriction of the second parameter, and selecting a first number of SL resources and performing one or more SL-PRS (re)transmissions and one or more PSSCH (re)transmissions on the selected number of SL resources, in accordance with embodiments of the present invention.

Referring to FIG. 7, with this and other concepts, systems, and methods of the present invention, a method 1020 for a first device in a wireless communication system comprises being configured with an SL-PRS shared resource pool (step 1022), being configured with a second parameter of a maximum number of PSSCH transmissions in the SL-PRS shared resource pool (step 1024), selecting a first number of SL-PRS (re)transmissions and/or PSSCH (re)transmissions given a restriction of the second parameter (step 1026), and selecting a first number of SL resources and performing one or more SL-PRS (re)transmissions and one or more PSSCH (re)transmissions on the selected number of SL resources (step 1028).

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) be configured with an SL-PRS shared resource pool; (ii) be configured with a second parameter of a maximum number of PSSCH transmissions in the SL-PRS shared resource pool; (iii) select a first number of SL-PRS (re)transmissions and/or PSSCH (re)transmissions given a restriction of the second parameter; and (iv) select a first number of SL resources and perform one or more SL-PRS (re)transmissions and one or more PSSCH (re)transmissions on the selected number of SL resources. Moreover, the CPU 308 can execute the program code 312 to perform all of the described actions, steps, and methods described above, below, or otherwise herein.

Figure 8:
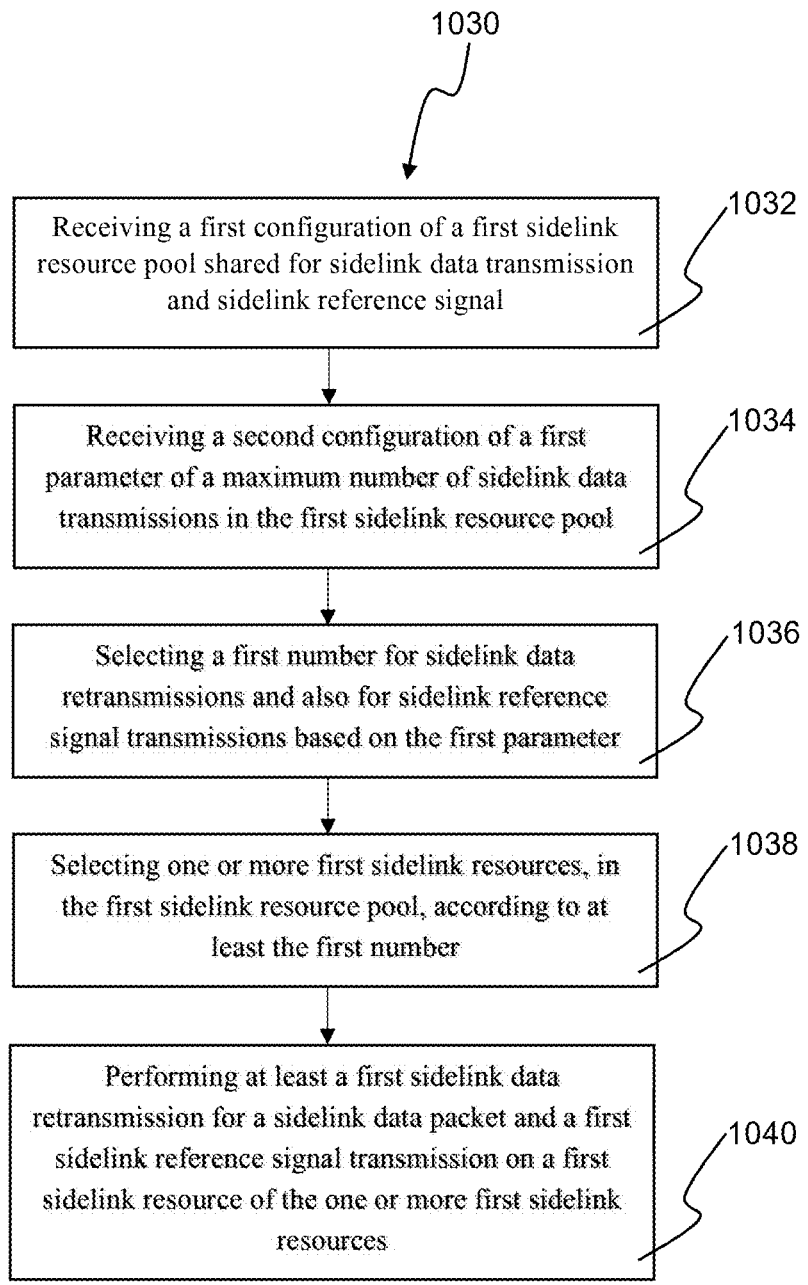
FIG. 8 is a flow diagram of a method of a first UE in a wireless communication system comprising receiving a first configuration of a first sidelink resource pool shared for sidelink data transmission and sidelink reference signal, receiving a second configuration of a first parameter of a maximum number of sidelink data transmissions in the first sidelink resource pool, selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resources, in accordance with embodiments of the present invention.

Referring to FIG. 8, with this and other concepts, systems, and methods of the present invention, a method 1030 for a first device in a wireless communication system comprises receiving a first configuration of a first sidelink resource pool shared for sidelink data transmission and sidelink reference signal (step 1032), receiving a second configuration of a first parameter of a maximum number of sidelink data transmissions in the first sidelink resource pool (step 1034), selecting a first number for sidelink data retransmissions and also for sidelink reference signal transmissions based on the first parameter (1036), selecting one or more first sidelink resources, in the first sidelink resource pool, according to at least the first number (step 1038), and performing at least a first sidelink data retransmission for a sidelink data packet and a first sidelink reference signal transmission on a first sidelink resource of the one or more first sidelink resources (step 1040).

In various embodiments, the first number is selected given restriction of the first parameter, and/or the first number is selected from allowed numbers given by the first parameter, and/or a total number of the one or more first sidelink resources is smaller than or equal to the first number.

In various embodiments, when the first device receives or detects positive acknowledgement for the sidelink data packet or for the first sidelink data retransmission, or when the first device receives or detects no negative acknowledgement for the sidelink data packet or for the first sidelink data retransmission if a negative-only acknowledgement was enabled for the sidelink data packet, flushing a HARQ buffer for the sidelink data packet and ignoring remaining sidelink resources of the one or more first sidelink resources for performing any sidelink data retransmissions and any sidelink reference signal transmissions (e.g., stopping or canceling utilizing the remaining sidelink resources of the one or more first sidelink resources).

In various embodiments, the first sidelink reference signal transmission and the first sidelink data retransmission are associated with any of a same (Layer-1 or Layer-2) destination ID, a same (Layer-1 or Layer-2) source ID, and/or a same cast type, and/or the first sidelink reference signal transmission and the sidelink data packet are associated with any of the same (Layer-1 or Layer-2) destination ID, the same (Layer-1 or Layer-2) source ID, and/or the same cast type, and/or the first sidelink reference signal transmission and the first sidelink data retransmission are multiplexed in a TDM manner on the first sidelink resource, and/or the first sidelink reference signal transmission and the first sidelink data retransmission are multiplexed in symbol-level division on the first sidelink resource.

In various embodiments, the first sidelink data retransmission is a first PSSCH retransmission, and/or the first sidelink reference signal is a first SL-PRS, and/or the first sidelink resource pool for sidelink data transmission and sidelink reference signal is a shared SL-PRS resource pool, and/or the first sidelink reference signal is a first sidelink CSI reference signal for beam management, and/or the first sidelink reference signal is utilized for any of positioning, ranging, beam management, high-resolution localization, sensing, or imaging.

In various embodiments, the method further comprises receiving a third configuration of a second sidelink resource pool dedicated for sidelink reference signal, receiving a fourth configuration of a second parameter of a maximum number of sidelink reference signal transmissions in the second sidelink resource pool, selecting a second number for sidelink reference signal transmission based on the second parameter, selecting one or more second sidelink resources, in the second sidelink resource pool, according to at least the second number, and performing at least a second sidelink reference signal transmission on a second sidelink resource of the one or more second sidelink resources.

In various embodiments, the second number is selected given restriction of the second parameter, and/or the second number is selected from allowed numbers given by the second parameter, and/or a total number of the one or more second sidelink resources is smaller than or equal to the second number.

In various embodiments, the second sidelink reference signal is a second SL-PRS, and/or the second sidelink resource pool dedicated for sidelink reference signal is a dedicated SL-PRS resource pool, and/or the second sidelink reference signal is a second sidelink CSI reference signal for beam management, and/or the second sidelink reference signal is utilized for any of positioning, ranging, beam management, high-resolution localization, sensing, or imaging.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a first configuration of a first sidelink resource pool shared for sidelink data transmission and sidelink reference signal; (ii) receive a second configuration of a first parameter of a maximum number of sidelink data transmissions in the first sidelink resource pool; (iii) select a first number for sidelink data retransmissions and also for sidelink reference signal transmissions based on the first parameter; (iv) select one or more first sidelink resources, in the first sidelink resource pool, according to at least the first number; and (v) perform at least a first sidelink data retransmission for a sidelink data packet and a first sidelink reference signal transmission on a first sidelink resource of the one or more first sidelink resources. Moreover, the CPU 308 can execute the program code 312 to perform all of the described actions, steps, and methods described above, below, or otherwise herein.

Figure 9:
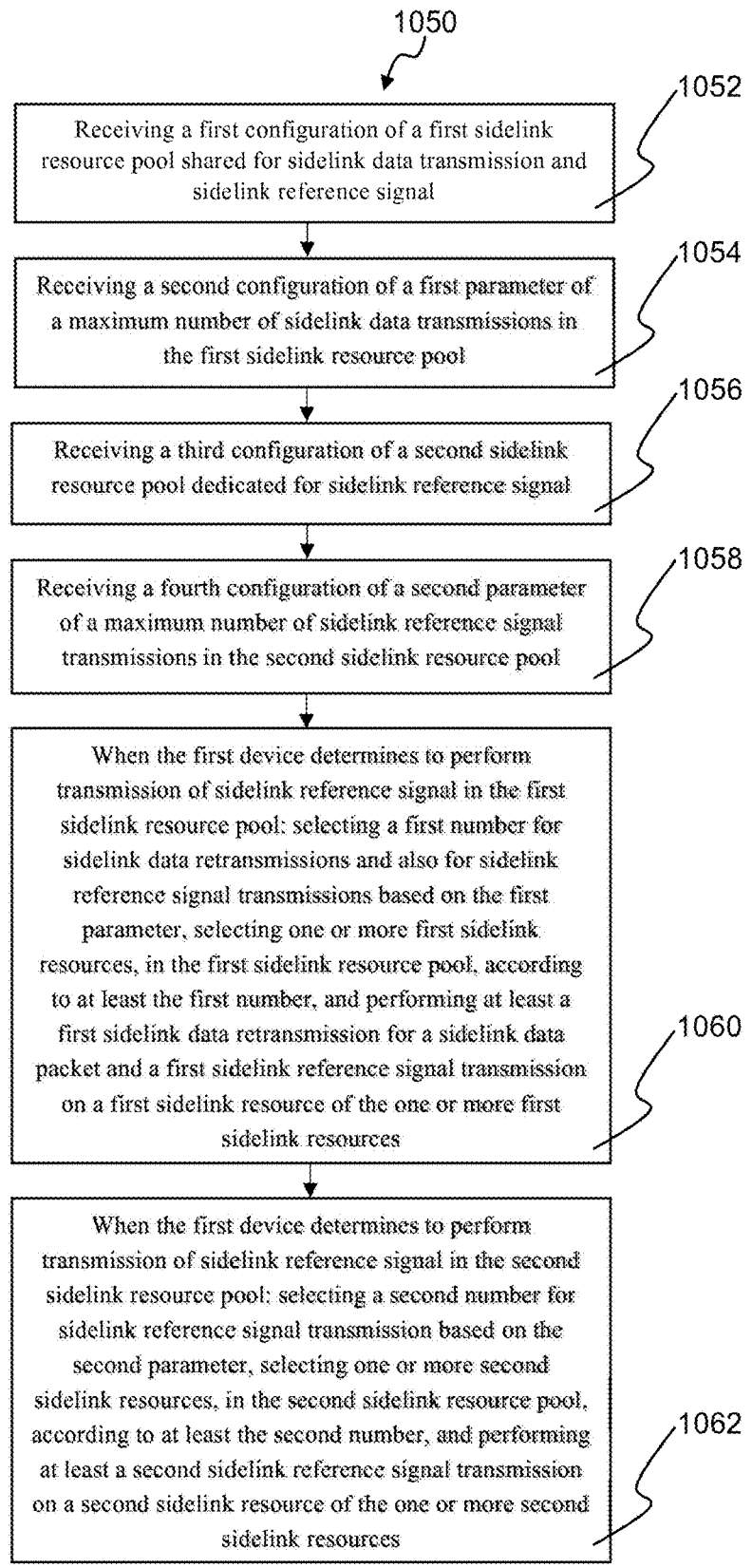
FIG. 9 is a flow diagram of a method of a first UE in a wireless communication system comprising receiving a first configuration of a first sidelink resource pool shared for sidelink data transmission and sidelink reference signal, receiving a second configuration of a first parameter of a maximum number of sidelink data transmissions in the first sidelink resource pool, receiving a third configuration of a second sidelink resource pool dedicated for sidelink reference signal, receiving a fourth configuration of a second parameter of a maximum number of sidelink reference signal transmissions in the second sidelink resource pool, wherein when the first device determines to perform transmission of sidelink reference signal in the first sidelink resource pool: selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resources, and wherein when the first device determines to perform transmission of sidelink reference signal in the second sidelink resource pool: selecting a second number for sidelink reference signal transmission based on the second parameter, selecting one or more second sidelink resources, in the second sidelink resource pool, according to at least the second number, and performing at least a second sidelink reference signal transmission on a second sidelink resource of the one or more second sidelink resources, in accordance with embodiments of the present invention.

Referring to FIG. 9 with this and other concepts, systems, and methods of the present invention, a method 1050 for a first device in a wireless communication system comprises receiving a first configuration of a first sidelink resource pool shared for sidelink data transmission and sidelink reference signal (step 1052), receiving a second configuration of a first parameter of a maximum number of sidelink data transmissions in the first sidelink resource pool (step 1054), receiving a third configuration of a second sidelink resource pool dedicated for sidelink reference signal (step 1056), receiving a fourth configuration of a second parameter of a maximum number of sidelink reference signal transmissions in the second sidelink resource pool (step 1058), when the first device determines to perform transmission of sidelink reference signal in the first sidelink resource pool (or when the transmission of sidelink reference signal is to be performed in the first sidelink resource pool): selecting a first number for sidelink data retransmissions and also for sidelink reference signal transmissions based on the first parameter, selecting one or more first sidelink resources, in the first sidelink resource pool, according to at least the first number, and performing at least a first sidelink data retransmission for a sidelink data packet and a first sidelink reference signal transmission on a first sidelink resource of the one or more first sidelink resources (step 1060), and/or when the first device determines to perform transmission of sidelink reference signal in the second sidelink resource pool (or when the transmission of sidelink reference signal is to be performed in the second sidelink resource pool): selecting a second number for sidelink reference signal transmission based on the second parameter, selecting one or more second sidelink resources, in the second sidelink resource pool, according to at least the second number, and performing at least a second sidelink reference signal transmission on a second sidelink resource of the one or more second sidelink resources (step 1062).

In various embodiments, the first device determining to perform the transmission of sidelink reference signal comprises the sidelink reference signal being triggered for transmission. In various embodiments, the first device determines to perform the transmission of sidelink reference signal in response to the sidelink reference signal being triggered for transmission.

In various embodiments, the transmission of sidelink reference signal being performed comprises the transmission of sidelink reference signal being triggered, e.g., triggered by upper layer or by reception of a SCI from a peer device.

In various embodiments, the first number is selected given restriction of the first parameter, and/or the first number is selected from allowed numbers given by the first parameter, and/or a total number of the one or more first sidelink resources is smaller than or equal to the first number.

In various embodiments, the second number is selected given restriction of the second parameter, and/or the second number is selected from allowed numbers given by the second parameter, and/or a total number of the one or more second sidelink resources is smaller than or equal to the second number.

In various embodiments, when the first device receives or detects positive acknowledgement for the sidelink data packet or for the first sidelink data retransmission, or when the first device receives or detects no negative acknowledgement for the sidelink data packet or for the first sidelink data retransmission if a negative-only acknowledgement was enabled for the sidelink data packet, flushing a HARQ buffer for the sidelink data packet and ignoring remaining sidelink resources of the one or more first sidelink resources for performing any sidelink data transmission and any sidelink reference signal transmission (e.g., stopping or canceling utilizing the remaining sidelink resources of the one or more first sidelink resources).

In various embodiments, the first sidelink reference signal transmission and the first sidelink data retransmission are associated with any of a same (Layer-1 or Layer-2) destination ID, a same (Layer-1 or Layer-2) source ID, and/or a same cast type, and/or the first sidelink reference signal transmission and the sidelink data packet are associated with any of the same (Layer-1 or Layer-2) destination ID, the same (Layer-1 or Layer-2) source ID, and/or the same cast type, and/or the first sidelink reference signal transmission and the first sidelink data retransmission are multiplexed in a TDM manner on the first sidelink resource, and/or the first sidelink reference signal transmission and the first sidelink data retransmission are multiplexed in symbol-level division on the first sidelink resource.

In various embodiments, the first sidelink data retransmission is a first PSSCH retransmission, and/or the first sidelink reference signal is a first SL-PRS, and/or the first sidelink resource pool for sidelink data transmission and sidelink reference signal is a shared SL-PRS resource pool, and/or the first sidelink reference signal is a first sidelink CSI reference signal for beam management, and/or the first sidelink reference signal is utilized for any of positioning, ranging, beam management, high-resolution localization, sensing, or imaging.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a first configuration of a first sidelink resource pool shared for sidelink data transmission and sidelink reference signal; (ii) receive a second configuration of a first parameter of a maximum number of sidelink data transmissions in the first sidelink resource pool; (iii) receive a third configuration of a second sidelink resource pool dedicated for sidelink reference signal; (iv) receive a fourth configuration of a second parameter of a maximum number of sidelink reference signal transmissions in the second sidelink resource pool; (v) when the first device determines to perform transmission of sidelink reference signal in the first sidelink resource pool: select a first number for sidelink data retransmissions and also for sidelink reference signal transmissions based on the first parameter, select one or more first sidelink resources, in the first sidelink resource pool, according to at least the first number, and perform at least a first sidelink data retransmission for a sidelink data packet and a first sidelink reference signal transmission on a first sidelink resource of the one or more first sidelink resources; and (vi) when the first device determines to perform transmission of sidelink reference signal in the second sidelink resource pool: select a second number for sidelink reference signal transmission based on the second parameter, select one or more second sidelink resources, in the second sidelink resource pool, according to at least the second number, and perform at least a second sidelink reference signal transmission on a second sidelink resource of the one or more second sidelink resources. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two.

A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:
receiving a first configuration of a first sidelink resource pool shared for sidelink data transmission and sidelink reference signal;
receiving a second configuration of a first parameter of a maximum number of sidelink data transmissions in the first sidelink resource pool;
selecting a first number for sidelink data retransmissions and also for sidelink reference signal transmissions based on the first parameter;
selecting one or more first sidelink resources, in the first sidelink resource pool, according to at least the first number; and
performing at least a first sidelink data retransmission for a sidelink data packet and a first sidelink reference signal transmission on a first sidelink resource of the one or more first sidelink resources.

2. The method of claim 1, wherein:
the first number is selected given restriction of the first parameter, and/or
the first number is selected from allowed numbers given by the first parameter, and/or a total number of the one or more first sidelink resources is smaller than or equal to the first number.

3. The method of claim 1, wherein:
when the first device receives or detects positive acknowledgement for the sidelink data packet or for the first sidelink data retransmission, or when the first device receives or detects no negative acknowledgement for the sidelink data packet or for the first sidelink data retransmission if a negative-only acknowledgement was enabled for the sidelink data packet, flushing a Hybrid Automatic Repeat Request (HARQ) buffer for the sidelink data packet and ignoring remaining sidelink resources of the one or more first sidelink resources for performing any sidelink data retransmissions and any sidelink reference signal transmissions.

4. The method of claim 1, wherein:
the first sidelink reference signal transmission and the first sidelink data retransmission are associated with any of a same destination Identification (ID), a same source ID, and/or a same cast type, and/or
the first sidelink reference signal transmission and the sidelink data packet are associated with any of the same destination ID, the same source ID, and/or the same cast type, and/or
the first sidelink reference signal transmission and the first sidelink data retransmission are multiplexed in a Time Division Multiplexing (TDM) manner on the first sidelink resource, and/or
the first sidelink reference signal transmission and the first sidelink data retransmission are multiplexed in symbol-level division on the first sidelink resource.

5. The method of claim 1, wherein:
the first sidelink data retransmission is a first Physical Sidelink Shared Channel (PSSCH) retransmission, and/or
the first sidelink reference signal is a first Sidelink Positioning Reference Signal (SL-PRS), and/or the first sidelink resource pool for sidelink data transmission and sidelink reference signal is a shared SL-PRS resource pool, and/or
the first sidelink reference signal is a first sidelink Channel State Information (CSI) reference signal for beam management, and/or
the first sidelink reference signal is utilized for any of positioning, ranging, beam management, high-resolution localization, sensing, or imaging.

6. The method of claim 1, further comprising:
receiving a third configuration of a second sidelink resource pool dedicated for sidelink reference signal;

receiving a fourth configuration of a second parameter of a maximum number of sidelink reference signal transmissions in the second sidelink resource pool;

selecting a second number for sidelink reference signal transmission based on the second parameter;

selecting one or more second sidelink resources, in the second sidelink resource pool, according to at least the second number; and performing at least a second sidelink reference signal transmission on a second sidelink resource of the one or more second sidelink resources.

7. The method of claim 6, wherein:
the second number is selected given restriction of the second parameter, and/or
the second number is selected from allowed numbers given by the second parameter, and/or
a total number of the one or more second sidelink resources is smaller than or equal to the second number.

8. The method of claim 6, wherein:
the second sidelink reference signal is a second SL-PRS, and/or
the second sidelink resource pool dedicated for sidelink reference signal is a dedicated SL-PRS resource pool, and/or
the second sidelink reference signal is a second sidelink CSI reference signal for beam management, and/or
the second sidelink reference signal is utilized for any of positioning, ranging, beam management, high-resolution localization, sensing, or imaging.

9. A method of a first device, comprising:
receiving a first configuration of a first sidelink resource pool shared for sidelink data transmission and sidelink reference signal;
receiving a second configuration of a first parameter of a maximum number of sidelink data transmissions in the first sidelink resource pool;
receiving a third configuration of a second sidelink resource pool dedicated for sidelink reference signal;
receiving a fourth configuration of a second parameter of a maximum number of sidelink reference signal transmissions in the second sidelink resource pool;
wherein when the first device determines to perform transmission of sidelink reference signal in the first sidelink resource pool:
    selecting a first number for sidelink data retransmissions and also for sidelink reference signal transmissions based on the first parameter,
    selecting one or more first sidelink resources, in the first sidelink resource pool, according to at least the first number, and
    performing at least a first sidelink data retransmission for a sidelink data packet and a first sidelink reference signal transmission on a first sidelink resource of the one or more first sidelink resources; or
wherein when the first device determines to perform transmission of sidelink reference signal in the second sidelink resource pool:
    selecting a second number for sidelink reference signal transmission based on the second parameter,
    selecting one or more second sidelink resources, in the second sidelink resource pool, according to at least the second number, and
    performing at least a second sidelink reference signal transmission on a second sidelink resource of the one or more second sidelink resources.

10. The method of claim 9, wherein the first device determining to perform the transmission of sidelink reference signal comprises the sidelink reference signal being triggered for transmission, and/or wherein the first device determines to perform the transmission of sidelink reference signal in response to the sidelink reference signal being triggered for transmission.

11. The method of claim 9, wherein:
the first number is selected given restriction of the first parameter, and/or
the first number is selected from allowed numbers given by the first parameter, and/or
a total number of the one or more first sidelink resources is smaller than or equal to the first number.

12. The method of claim 9, wherein:
the second number is selected given restriction of the second parameter, and/or
the second number is selected from allowed numbers given by the second parameter, and/or
a total number of the one or more second sidelink resources is smaller than or equal to the second number.

13. The method of claim 9, wherein:
when the first device receives or detects positive acknowledgement for the sidelink data packet or for the first sidelink data retransmission, or when the first device receives or detects no negative acknowledgement for the sidelink data packet or for the first sidelink data retransmission if a negative-only acknowledgement was enabled for the sidelink data packet, flushing a Hybrid Automatic Repeat Request (HARQ) buffer for the sidelink data packet and ignoring remaining sidelink resources of the one or more first sidelink resources for performing any sidelink data transmission and any sidelink reference signal transmission.

14. The method of claim 9, wherein:
the first sidelink reference signal transmission and the first sidelink data retransmission are associated with any of a same destination Identification (ID), a same source ID, and/or a same cast type, and/or
the first sidelink reference signal transmission and the sidelink data packet are associated with any of the same destination ID, the same source ID, and/or the same cast type, and/or
the first sidelink reference signal transmission and the first sidelink data retransmission are multiplexed in a Time Division Multiplexing (TDM) manner on the first sidelink resource, and/or
the first sidelink reference signal transmission and the first sidelink data retransmission are multiplexed in symbol-level division on the first sidelink resource.

15. The method of claim 9, wherein:
the first sidelink data retransmission is a first Physical Sidelink Shared Channel (PSSCH) retransmission, and/or
the first sidelink reference signal is a first Sidelink Positioning Reference signal (SL-PRS), and/or the first sidelink resource pool for sidelink data transmission and sidelink reference signal is a shared SL-PRS resource pool, and/or
the first sidelink reference signal is a first sidelink CSI reference signal for beam management, and/or
the first sidelink reference signal is utilized for any of positioning, ranging, beam management, high-resolution localization, sensing, or imaging.

\* \* \* \* \*